United States Patent
Kaneko et al.

(10) Patent No.: US 6,480,833 B2
(45) Date of Patent: Nov. 12, 2002

(54) METHOD OF RESOLVING OVERLOADED ROUTINES, SYSTEM FOR IMPLEMENTING THE SAME AND MEDIUM FOR STORING PROCESSING PROGRAM THEREFOR

(75) Inventors: Eiji Kaneko, Yokohama; Morihiro Iwata, Tama; Masato Asami, Sagamihara; Masashi Tsuchida, Machida; Yoshito Kamegi, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/321,206

(22) Filed: May 27, 1999

(65) Prior Publication Data

US 2002/0055931 A1 May 9, 2002

(30) Foreign Application Priority Data

May 27, 1998 (JP) .......................................... 10-145224

(51) Int. Cl.⁷ ............................................. G06F 17/30
(52) U.S. Cl. ........................... 707/2; 707/4; 707/103 R; 717/151
(58) Field of Search ................................ 707/2, 4, 103, 707/103 R; 717/1, 9, 140, 151, 154

(56) References Cited

U.S. PATENT DOCUMENTS

| | | | |
|---|---|---|---|
| 5,488,727 A | * 1/1996 | Agrawal et al. | ................ 717/9 |
| 5,696,973 A | * 12/1997 | Agrawal et al. | ................ 717/9 |
| 5,696,974 A | * 12/1997 | Agrawal et al. | ................ 717/9 |

FOREIGN PATENT DOCUMENTS

| | | | |
|---|---|---|---|
| JP | 370048 | 3/1991 | ........... G06F/12/00 |
| JP | 4242426 | 8/1992 | .............. G06F/9/06 |
| JP | 594349 | 4/1993 | ........... G06F/12/00 |
| JP | 5120100 | 5/1993 | ........... G06F/12/00 |

OTHER PUBLICATIONS

A. Wade, Object Query Standards, SIGMOD Record, vol. 25, No. 1, Mar. 1996, pp. 87–93.

* cited by examiner

Primary Examiner—John Breene
Assistant Examiner—Khanh Pham
(74) Attorney, Agent, or Firm—Antonelli, Terry, Stout & Kraus, LLP

(57) ABSTRACT

An overloaded routines resolving method of analyzing an invocation for the group of overloaded routines to determine the routine to be called, the method including: the routine group sorting step of sorting the group of routines on the basis of the predetermined precedence; the reference utilization pruning step of determining the routine which has the highest precedence of a data type of an argument from among the routines which can be called for the types in the definition of the arguments of the invocation from the sorted routines and of deleting any of the routines each of which has the lower precedence than that of the routine thus determined from the candidates; and the sort order characteristic pruning step of comparing the data types of the arguments among the routines which still remain after having executed the reference utilization pruning step to delete any of the routines each of which has no possibility of being called from the candidates. From the foregoing, the necessary minimum candidate can be selected efficiently in the overloaded routines resolution which is carried out when analyzing the query for the database.

15 Claims, 14 Drawing Sheets

FIG. 4
EXAMPLE OF CALLING ROUTINE 601
```
...
DECLARE  price  money;
DECLARE  size  INTEGER;          602
DECLARE  property  house;
...
SET  r = sale_info(price,size,property);    603
...
```
INHERITANCE HIERARCHIES OF ABSTRACT DATA TYPES 604
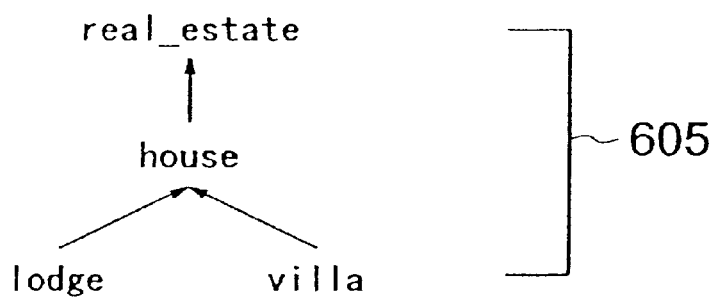
605
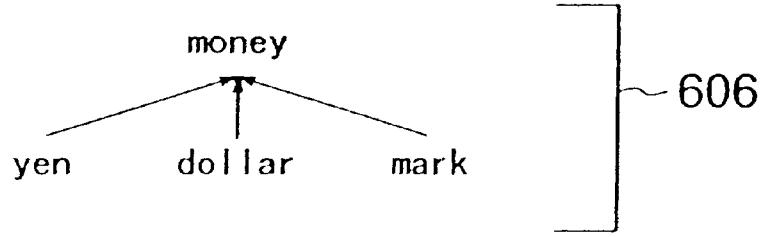
606

EXAMPLE OF ROUTINE GROUP INFORMATION

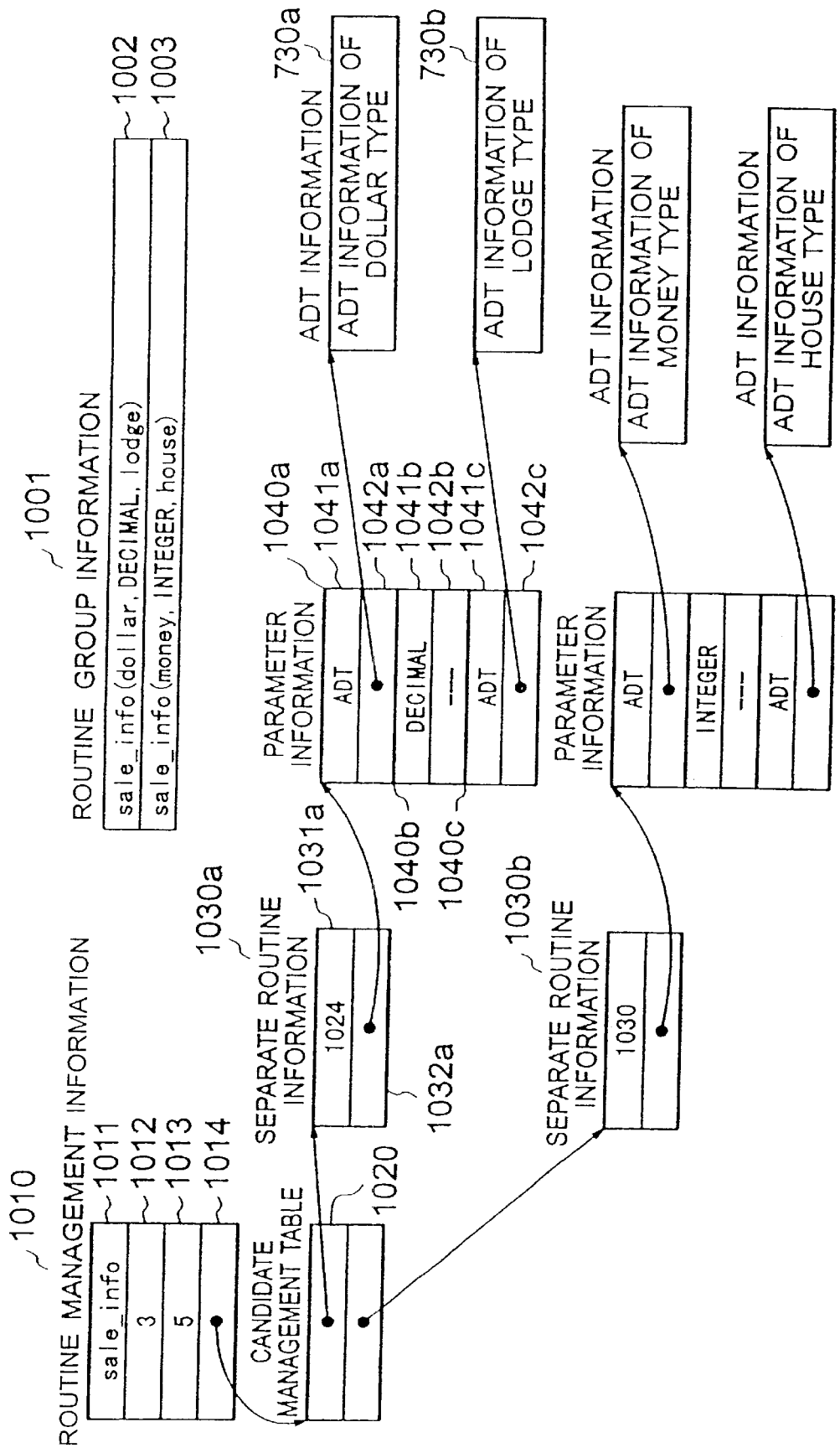

FIG. 10

EXAMPLE OF CALLABLE ROUTINE ~1200

- 1201 — sale_info(dollar, INTEGER, house)
- 1202 — sale_info(money, INTEGER, house)
- 1203 — sale_info(money, INTEGER, real_estate)
- 1204 — sale_info(dollar, DECIMAL, lodge)
- 1205 — sale_info(yen, INTEGER, lodge)

FIG. 11

EXAMPLE OF SORTED CALLABLE ROUTINE ~1300

- 1205 — sale_info(yen, INTEGER, lodge)
- 1201 — sale_info(dollar, INTEGER, house)
- 1204 — sale_info(dollar, DECIMAL, lodge)
- 1202 — sale_info(money, INTEGER, house)
- 1203 — sale_info(money, INTEGER, real_estate)

PRECEDENCE OF PARAMETERS ~1310

FIRST PARAMETER
{yen, dollar, mark, money}
SECOND PARAMETER
{INTEGER, DECIMAL, FLOAT}
THIRD PARAMETER
{lodge, villa, house, real_estate}

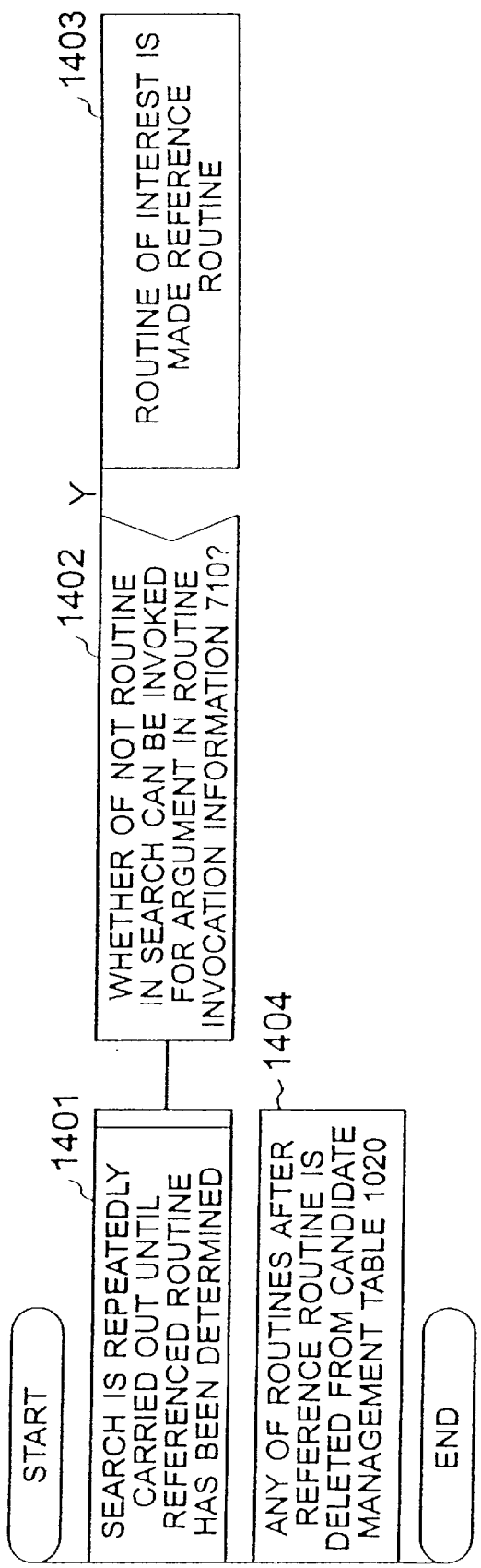

METHOD OF RESOLVING OVERLOADED ROUTINES, SYSTEM FOR IMPLEMENTING THE SAME AND MEDIUM FOR STORING PROCESSING PROGRAM THEREFOR

BACKGROUND OF THE INVENTION

The present invention relates in general to a database system for resolving an invocation for the overloaded routines, and more particularly to the technology which is effectively applied to a database system which has the function of the overloaded routines and which serves to analyze an invocation for a group of overloaded routines to determine the called routine.

For the demand of users who want to handle the data having various structures in a database, the study and the development for an object database have been carried out, while the attempt of adopting the object oriented concept into a relational database has been made, and the standardization therefor has been advanced in the form of the next term SQL (Structured Query Language).

In the next term SQL, in order to handle the data having various structures, the data type called the abstract data type which is defined by a user is introduced thereinto. In addition, the realization of manipulation for those data is made possible on the basis of a function and a procedure (hereinafter, referred to as "routines" for short, when applicable), and the function of the multiple definition for those routines is provided.

The SQL as the database query language will hereinafter be described as an example. But, this description will be applied similarly to even any one of other database query languages each having the function similar to the abstract data type and the multiple definition.

First of all, the multiple definition and the abstract data type of the next term SQL will hereinbelow be described as the prior art relating to the present invention. Firstly, the multiple definition will now be described. Defining a plurality of routines which have the same name and which are different in the number of arguments and the data type from one another is called the multiple definition (hereinafter, by the arguments are meant the arguments on the routine calling side and by the parameters are meant the arguments on the called routine side). The database system selects and applies, for the routine invocation, the routine which is optimal in both of the number of parameters and the data type from among the routines which are already overloaded.

In SQL/PSM which has been developed from the database structured query language SQL, a function and the feature of the multiple definition thereof are adopted into the SQL. SQL/PSM is, for example, described in an article of ISO/IEC DIS 9075-4: 1996, "Database languages SQL Part 4: Persistent Stored Modules (SQL/PSM)" or the like. This multiple definition of the function of SQL/PSM will now be described by giving an example.

FIG. 17 is a diagram showing a conventional example of an SQL statement based on which the overloaded functions are called. In this example 101 of the SQL statement, the function numeric_string is called in which the numeric number type is adopted as the argument and the values associated therewith are converted into the character string to be returned. Reference numeral 102 designates the definition of the functions. In the definition 102 of the functions, it is shown that a function 103 which is defined in the definition of the function 102 adopts as the argument an INTEGER type (integral number type) and a function 104 adopts as the argument a FLOAT type (round number type). In actual, those functions are defined on the basis of the statement which is used to define the functions such as a CREATE FUNCTION.

On the basis of an SQL statement 105, a variable x is declared as being of the INTEGER type and also a variable y is declared as being of a DECIMAL type (decimal integral number). In an SQL statement 106, the function numeric_string is called with the variable of the INTEGER type as the argument. For the function numeric_string, since the data type of the argument is the INTEGER type, a function 103 is applied in which the INTEGER type is adopted as the argument.

On the other hand, in an SQL statement 107, the function numeric_string is called with the variable y of the DECIMAL type as the argument. In the definition 102 of the functions, the function numeric_string is not yet defined in which the FLOAT type is adopted as the argument. Therefore, a function 104 is applied in which the FLOAT type as the data type which is lower in the precedence than the DECIMAL type on a data type precedence list 108 of the numeric number type and which has the highest precedence on the data type precedence list 108 is adopted as the argument.

In this connection, the data type precedence list 108 is such that the data types which can be applied to the data type of the numeric number type which is specified to the argument of the routine invocation are arranged in the order of the precedence from the left-hand side to the right-hand side. For example, in the data type precedence list 108, when the data type of the argument of the routine invocation is the DECIMAL type, the routines which have the DECIMAL type and the FLOAT type as the parameters, respectively, can be applied. In addition thereto, since the DECIMAL type is formerly described, the routine having the DECIMAL type as the parameter is applied. Even if the number of arguments and the name of the routine match those of the associated one, both of the routine which has as the parameter the data type which is absent on the data type precedence list 108 and the routine which has as the parameter the data type which is higher in the precedence than the data type specified to the argument are not applied.

As described above, from among the overloaded routines, there is applied the routine which has as the parameter the data type which is most suitable to the data type of the argument of the routine invocation. The determination of the application routine is called the resolution of the overloaded routines.

The precedure of the data types in the data type precedure list 108 corresponds to the criterion which the database uses to carry out the analysis of the query, and in this example, the precedence is determined in the order of the INTEGER type, the DECIMAL type and the FLOAT type. But, it should be noted that even if not following this precedence order, as long as the regular precedence is determined among the data types, that precedence can be made the precedence for the data type precedence list 108.

Next, the description will hereinbelow be given with respect to the Abstract Data Type (hereinafter, referred to as "an ADT" for short, when applicable) of the next term SQL. The ADT corresponds to the class in the object orientation and is the data type which a user who has the concept of inheritance can define. For a certain ADT, the data type of the subtype which can be said as the subclass thereof can be defined. The host data type when viewed from the data type of the subtype is called the supertype. The data type of the subtype can inhetit the attribute of the data type of the supertype and also can substitute both of the data type in which the ADT variable is defined and the data type of the subtype thereof for variables which are defined with the ADT (hereinafter, referred to as "ADT variables" for short, when applicable). Unlike the normal substitution of the data type, in the substitution in this case, the data type from which the substitution is made is not type-converted into the data type to which the substitution is made, but the data type to which the substitution is made is applied to the data type from which the substitution is made.

On the other hand, the data type of the supertype can not be substituted for any of the ADT variables. Therefore, with respect to the variable which is defined with the ADT having the subtype, the data type thereof can not be specified when analyzing the SQL and the data type thereof can not be aware of until the SQL is executed. This is applied to the variables which are defined with the ADT as well as to the string which is defined with the ADT.

In this connection, both of the next term SQL and the ADT are, for example, described in an article of Andrew E. Wade, Ph. D.: "Object Query Standards", ACM SIGMOD Record, Vol. 25, No. 1, pp. 87 to 92, March 1996 or the like. In addition, Draft of Standardization of the next term SQL is, for example, described in an article of ISO/IEC JTC 1/SC 21/WG3 DBL-MCI-004, ISO Warking Draft Database Language SQL, 1996.

Next, the description will hereinbelow be given with respect to the resolving method in the case where the routine which adopts as the argument the ADT shown in the next term SQL is overloaded with reference FIG. 18. FIG. 18 is a diagram showing a conventional example of the SQL statement based on which the invocation of functions each of which adopts the ADT as the argument and which are overloaded is being carried out. In an example 201 of the SQL statement, a function dollar_amount is called in which the ADT belonging to a money type which is defined with the ADT is received as the argument to return the result which has been obtained by the conversion into a dollar type.

There is shown an example in which a money type as the ADT, and as its subtypes, a yen type, the dollar type and a mark type are defined in an abstract data type inheritance hierarchy 202. While not particularly illustrated in the figure, the ADTs and the inheritance hierarchy thereof are defined on the basis of the data type definition statement such as a CREATE TYPE. Reference numeral 203 designates the definition of functions. In the figure, it is shown that a function 204 adopts as the argument the yen type as the ADT, and a function 205 adopts as the argument the money type as the ADT.

This example will hereinbelow be described concretely. In an SQL statement 206, a variable x is declared as being of the money type as the ADT. As a result, the yen type, the dollar type or the mark type as the subtype can be substituted for the variable x.

In an SQL statement 207, a return value of a function yen is substituted for the variable x. This shows that the yen type is substituted for the variable x. In an SQL statement 208, a function dollar_amount is called with the variable x as the argument. Since the data type of the argument x at this time is the yen type, the function 204 which has the yen type as the parameter is applied.

In an SQL statement 209, a return value type of a function dollar ( ) is substituted for the variable x. This shows that the dollar type is substituted for the variable x. In an SQL statement 210, the function dollar_amount is called with the variable x as the argument. While the data type of the argument x at this time is the dollar type, no function which adopts the dollar type as the argument is defined in the definition table 203.

Then, the function 205 is applied which adopts as the argument the money type having the precedence which ranks next to the dollar type on the data type precedence list 211 of the dollar type. This reason is that since the dollar type as the subtype can be substituted for the money type, the function 205 which has the money type as the parameter can also be applied. From among the overloaded routines, the optimal routine is applied in response to the routine invocation in the case where the ADT is specified to the argument by the above-mentioned method.

A data type precedence list 211 of the dollar type shows the precedence of the dollar type as the ADT for which the dollar type can be substituted, and the supertype thereof. In the next term SQL, in the case of the single inheritance, in the data type precedence list of a certain ADT, the data type itself of interest is given top precedence next to which the supertype thereof ranks next to which the supertype thereof ranks . . . In such a way, the precedence is determined. Incidentally, in this example, the description will be given with respect to the case of the single inheritance in which one ADT can have only one direct supertype.

A plurality of arguments of the overloaded routines may also be adopted. Likewise, the multiple definition for the routines which adopts a plurality of arguments of the ADT is also possible. Next, the description will hereinbelow be given with respect to the case where the functions are overloaded which adopt as the arguments the ADT and the data type other than the ADT, respectively, with reference to drawings.

FIG. 19 is a diagram showing a conventional example of calling a function in the case where the functions are overloaed which adopt as the arguments the ADT and the data type other than the ADT, respectively. In the figure, reference numeral 301 designates an example of an SQL statement which is used to call a function sale_info for returning the sale information of the real estimate. In an SQL statement 302, variables are declared which are specified to the arguments of the function sale_info. That is, a variable price is declared with the money type as the ADT, a variable size is declared with the INTEGER type (integral number type) and a variable property is declared with a house type as the ADT.

The inheritance hierarchies of the ADTs are shown in inheritance hierarchies 303 and 304 of the abstract data type. The inheritance hierarchy 303 shows that a house type is present as the subtype of a real_estate type and also both of a lodge type and a villa type are present as the subtypes of the house type. In addition, the inheritance herarchy 304 shows that a yen type, a dollar type and a mark type are present as the subtypes of the money type.

In an SQL statement 305, the function sale_info is called with the variables price, size and property as the arguments. Since the subtype can be substituted for the variable which is defined with the ADT, the four data types of the money type and as the subtypes thereof, the yen type, the dollar type and the mark type can be substituted for the variable price of the money type. Likewise, the three data types of the house type and as the subtypes thereof, the lodge type and the villa type can be each substituted for the variable property of the house type. Even if any of other numerical value types is substituted for the variable size, the variable size is not changed from INTEGER type at all.

Therefore, in the case of this example, as shown in a table 306, there are conceivable the 4×3=12 kinds of data types of the arguments. For the combination of the twelve kinds of data types of the arguments, the functions to be applied are respectively determined from among the functions 308 to 312.

In the next term SQL, for the resolution of such overloaded routines, the precedence is determined in the order of the left-hand side to the right-hand side of the arguments. In this example shown in FIG. 19, if it is assumed that the data types of the arguments of the function sale_info are, from the left-hand side, the yen type, the INTEGER type and the lodge type, the functions which the data types of the respective arguments can substitute are functions 308, 311 and 312. If the parameters of those functions are compared with one another from the left-hand side, for the yen type as the data type of the first argument, the function 308 which adopts likewise as the parameter the yen type is applied.

In such a way, if for the combinations of the arguments of the ADT shown in the table 306, the optimal functions to be applied are determined one by one from among the functions 308 to 312, then the functions which are respectively indicated by arrows will be applied. In this example, any one of the functions 308, 309 and 311 is applied in accordance with the data types which are substituted for the variables price and property as the arguments. On the other hand, even if what data type we substitute for each of the variables price and property, neither the function 310 nor 312 is applied at all.

While in this example, the precedence having the order from the left-hand side to the right-hand side of the arguments is employed in accordance with the method of resolving the overloaded routines of the next term SQL, even if the specific precedence is present, likewise, the resolution of the overloaded routines in the case of a plurality of arguments can be made possible.

As to the prior art of overloaded routines, please see an article of ISO/ITEC DBL:MCI-006.

SUMMARY OF THE INVENTION

In a database system, for the query for a database, the analysis of a syntax (parsing) and the analysis of meaning are carried out to produce the results of analyzing the query and the request for the query is processed on the basis of the query analysis results.

In the case where the function of calling a routine having an ADT as an argument is incorporated in the database, from the character in which the substitution of any one of other data having the inheritance hierarchy is possible, the analysis of the query for the database is not sufficient for the resolution of the multiple definition.

However, if the resolution of the overloaded routines is carried out when processing the execution for the query for the database, since whenever calling one routine, the optimal routine needs to be determined from obtaining the definition information of the routines, it is not practical in terms of the processing time thereof.

For example, when the overloaded functions are described in the search conditions of the database, if obtaining the definition information of the routines and the resolution of the multiple definition are carried out every case, then it will take a very long processing time to process the several tens of thousands of data stored in the database.

Then, it is conceivable that the candidates are previously pruned for the overloaded routines when analyzing the query for the database and on the basis of this result, the multiple definition is resolved by processing the execution of the query for the database.

When pruning the candidates in analysis of the query for the database, as in the example shown in FIG. 19, the combinations of all of the data types which may be contained in the arguments of the ADT are checked, which enables the necessary minimum candidate to be determined.

However, in the case where the above-mentioned prior art is employed, in even the example shown in FIG. 19, for the 4×3=12 kinds of combinations of the arguments as the product of the numbers of subtypes of the arguments of the ADT, the routines to be applied need to be determined, respectively, and hence the processing load becomes large. In addition, if the number of inheritance hierarchies of the ADT or the number of ADT arguments is increased, then the number of combinations of the data types which the arguments may adopt is explosively increased. Therefore, even when the number of overloaded routines is small, the processing of determining the routines to be applied needs to be executed by the number of combinations. As a result, it takes a very long time to execute the processing so that the performance which is practical as the database can not be realized.

In the light of the foregoing, the present invention was made in order to solve the above-mentioned problems associated with the prior art, and it is therefore an object of the present invention to provide the technology by which in the processing of pruning the candidates for resolving the overloaded routines when analyzing the query for a database, the candidates can be pruned with the less processing amount and also the necessary minimum candidate can be selected efficiently.

In order to solve the above-mentioned problems associated with the prior art, in the present invention, in the processing of analyzing the query for the database, the following steps are provided, whereby for the invocation for overloaded routines, the routines as the candidate are pruned efficiently and the routine to be applied is determined.

(1) The routine group sorting step: for the invocation for the routine, the definition information of routines in which the number of arguments and the name of the routine match those of the associated one is obtained to sort the group of routines thus obtained in the order of precedence with parameters as the key. In this connection, with respect to the precedence of the data types, for the numerical value types, the type precedence list is given precedence, and for the ADTs, the number of parents in the inheritance hierarchy (hereinafter, referred to as "the hierarchy level number" for short, when applicable), i.e., the ADT having the larger number of supertypes is given precedence. Incidentally, the functions 308 to 312 in the example shown in FIG. 19 are arranged in this sorting order.

(2) The reference utilization pruning step: for the sorted routine group which has been obtained on the basis of the above-mentioned routine group sorting step, the routine which is not applied to any of the actual data types of the ADTs of the arguments, but is applied to the data type on the definition (hereinafter, referred to as "the reference routine" for short, when applicable) is searched from the head of the sorted routine group, and any of routines which are not applied even when any of data types is substituted for any of the ADT arguments each having the lower precedence than that of the reference routine with respect to the sorting order is deleted from the candidates.

In the example shown in FIG. 19, on the basis of the step (2), the function 312 is deleted from the candidates.

However, the functions such as the function 310 each of which is the routine before the reference routine with respect to the sorting order and which are not actually applied still remains as the candidates.

(3) The sort order characteristic pruning step: assuming that in the sorted routine group which has remained after having executed the pruning processing in the above-mentioned reference utilization pruning step, arbitrary two routines are the routine A and the routine B in the order of the sorting precedence, if all of the data types each of which can be substituted for the parameter of the routine B can be each substituted for the parameters of the routine A as well, such a routine B is deleted.

The step (3) utilizes the characteristics that if a plurality of routines which can be invoked for the data type of a certain argument are present in the sorted routine group, then the routine which is given the top precedence in the sorting order is applied.

In the example shown in FIG. 19, since the data type which can be substituted for the parameter of the function 310 can also be similarly substituted for the parameter of the function 309, the function 310 is deleted from the candidates because there is no possibility of invoking the function 310.

(4) The application routine determining step: the routines each of which can be applied to the data types of the actual arguments are searched from the head of the sorted candidate routine group which has been obtained in the above-mentioned sort order characteristic pruning step, and then the routine which is found out first is applied.

As described above, according to a database system of the present invention, when analyzing the query for a database including the invocation of the overloaded routines, the routine which has the possibility of being applied is determined on the basis of the comparison of parameters among the overloaded routines. Therefore, in the processing of pruning the candidates for the overloaded routines resolution which is carried out when analyzing the query for the database, the candidates can be pruned with the less processing amount and also the necessary minimum candidate can be selected efficiently.

BRIEF DESCRIPTION OF THE DRAWINGS

The above and other objects as well as advantages of the present invention will become clear by the following description of the preferred embodiments of the present invention with reference to the accompanying drawings, wherein:

FIG. 4 is a diagram showing an example of calling a routine of the embodiment;

FIG. 9 is a diagram showing an example of the routine group information of the embodiment;

FIG. 10 is a diagram showing an example of callable routine information 502 of the embodiment;

FIG. 11 is a diagram showing an example of sorted callable routine information 504 of the embodiment;

FIG. 12 is a PAD diagram showing the details of a reference utilization pruning processing 505 of the embodiment;

FIG. 13 is a diagram showing an example of possibly sorted candidate routine information 506 of the embodiment;

DETAILED DESCRIPTION OF THE EMBODIMENTS

The description will hereinafter be given with respect to a database system of an embodiment for analyzing the invocation for the group of overloaded routines to determine a routine to be called with reference to the accompanying drawings.

Figure 1:
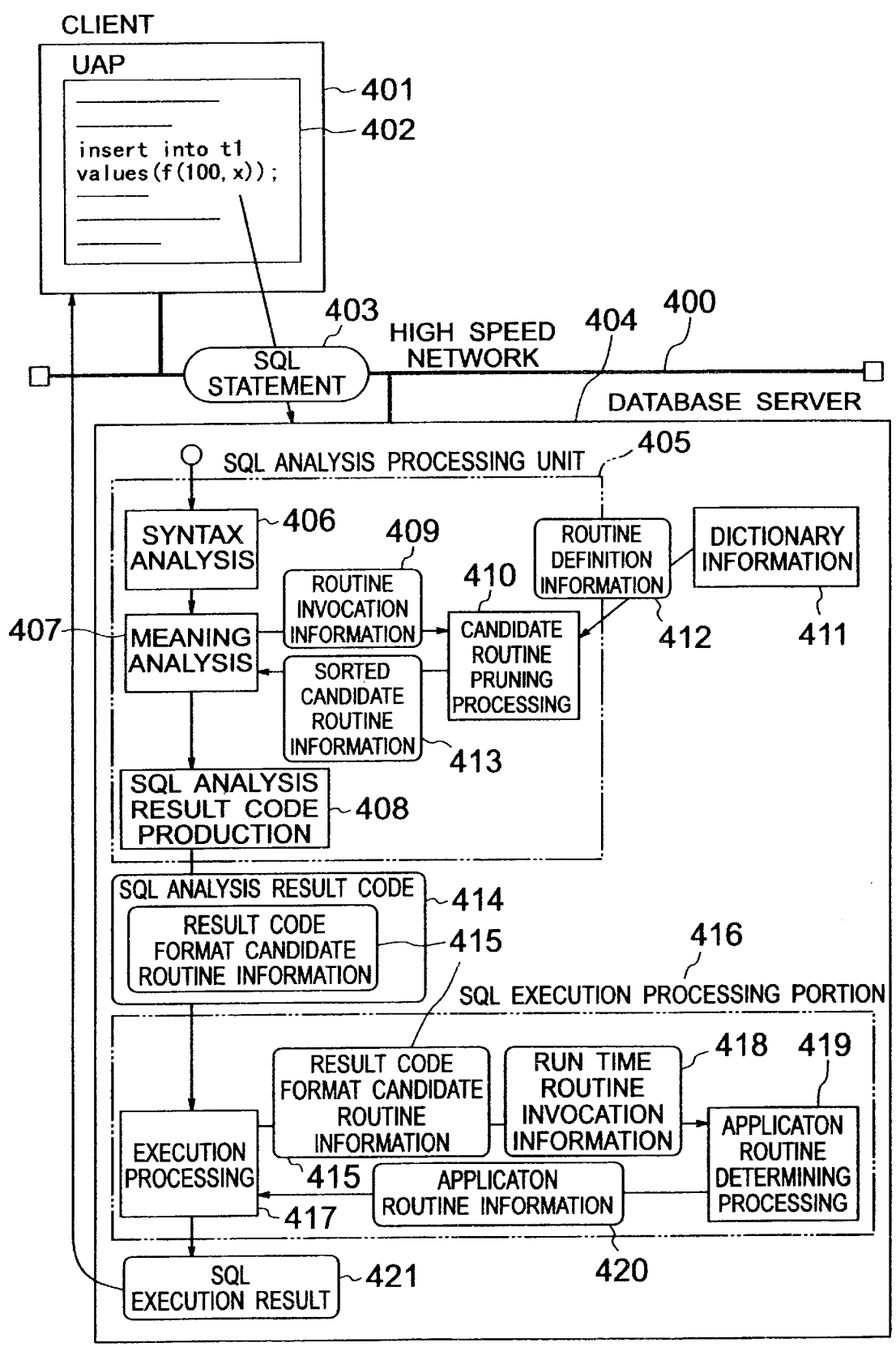
FIG. 1 is a block diagram showing a schematic configuration of a database system of an embodiment according to the present invention.

FIG. 1 is a block diagram showing a schematic configuration of a database system of an embodiment according to the present invention. The database system of the present embodiment includes a client 401 for managing a user application program (hereinafter, referred to as "a UAP" for short, when applicable) 402 for carrying out the query for the database, and a database server 404 for executing the processing for the query request for the database. Both of the client 401 and the database server 404 are assumed to be connected to each other through a high speed network 400.

A query 403 issued from the UAP 402 on the client 401 to the database is sent to the database server 404. The query 403 for the database which has been sent to the database server 404 is analyzed by an SQL analysis processing unit 405 which produces in turn an SQL analysis result code 414. Then, an SQL execution processing unit 416 executes the request which is represented by the query 403 for the database in accordance with the contents which are represented by the SQL analysis result code 414.

The SQL analysis processing portion 405 includes a syntax analysis processing portion 406, a meaning analysis processing portion 407, an SQL analysis result code production processing portion 408 and a candidate routine pruning processing portion 410. The syntax analysis processing 406 analyzes the syntax of the database query language. The meaning analysis processing portion 407 analyzes the meaning of the contents which are represented by the query 403 for the database on the basis of the result of analyzing the syntax which has been obtained in the syntax analysis processing portion 406. Then, if the invocation for the routine is contained in the database query 403, then the meaning analysis processing portion 407 produces routine invocation information 409 to call the candidate routine pruning processing portion 410.

The candidate routine pruning processing portion 410 obtains routine definition information 412 from dictionary information 411 on the basis of the routine invocation information 409 to produce sorted candidate routine information 413 becoming the candidate for the routine invocation. The necessary minimum routine which becomes the candidate for the routine invocation is determined from among the overloaded routines by the candidate routine pruning processing portion 410. The sorted candidate routine information 413 is delivered as the meaning analyzing result relating to the routine invocation to the meaning analysis processing portion 407.

The SQL analysis result code production processing portion 408 produces the SQL analysis result code 414 on the basis of analyzing the query 403 for the database which has been obtained in the meaning analysis processing portion 407.

If the invocation for the routine is contained in the query 403, then the result code format candidate routine information 415 in which the sorted candidate routine information 413 is provided in the form of the analysis result code format is contained in the SQL analysis result code 414. In this connection, the SQL analysis result code 414 may be either the code having the execution format or the code for interpreter.

The execution processing portion 417 provided in the SQL execution processing portion 416 carries out the manipulation for the database in accordance with the contents which are represented by the SQL analysis result code 414 which has been produced by the SQL analysis processing portion 405. If the routine invocation and the result code format candidate routine information 415 are contained in the SQL analysis result code 414, then run time routine invocation information 418 is produced and then an application routine determining processing portion 419 is called on the basis of the result code format candidate routine information 415.

The application routine determining processing portion 419 selects only one routine to be invoked from among the result code format candidate routine information 415 on the basis of the actual data type of the argument in the run time routine invocation information 418 to return application routine information 420 back to the execution processing portion 417.

The execution processing portion 417 calls actually the routine which is represented in the application routine information 420. As the result which has been provided by the SQL execution processing portion 416, an SQL execution result 421 is produced. Then, the SQL execution result 421 is sent from the database server 404 back to the UAP 402 on the client 401. As we have seen, the block diagram showing the overall configuration of the database system of the present embodiment has been described.

Figure 2:
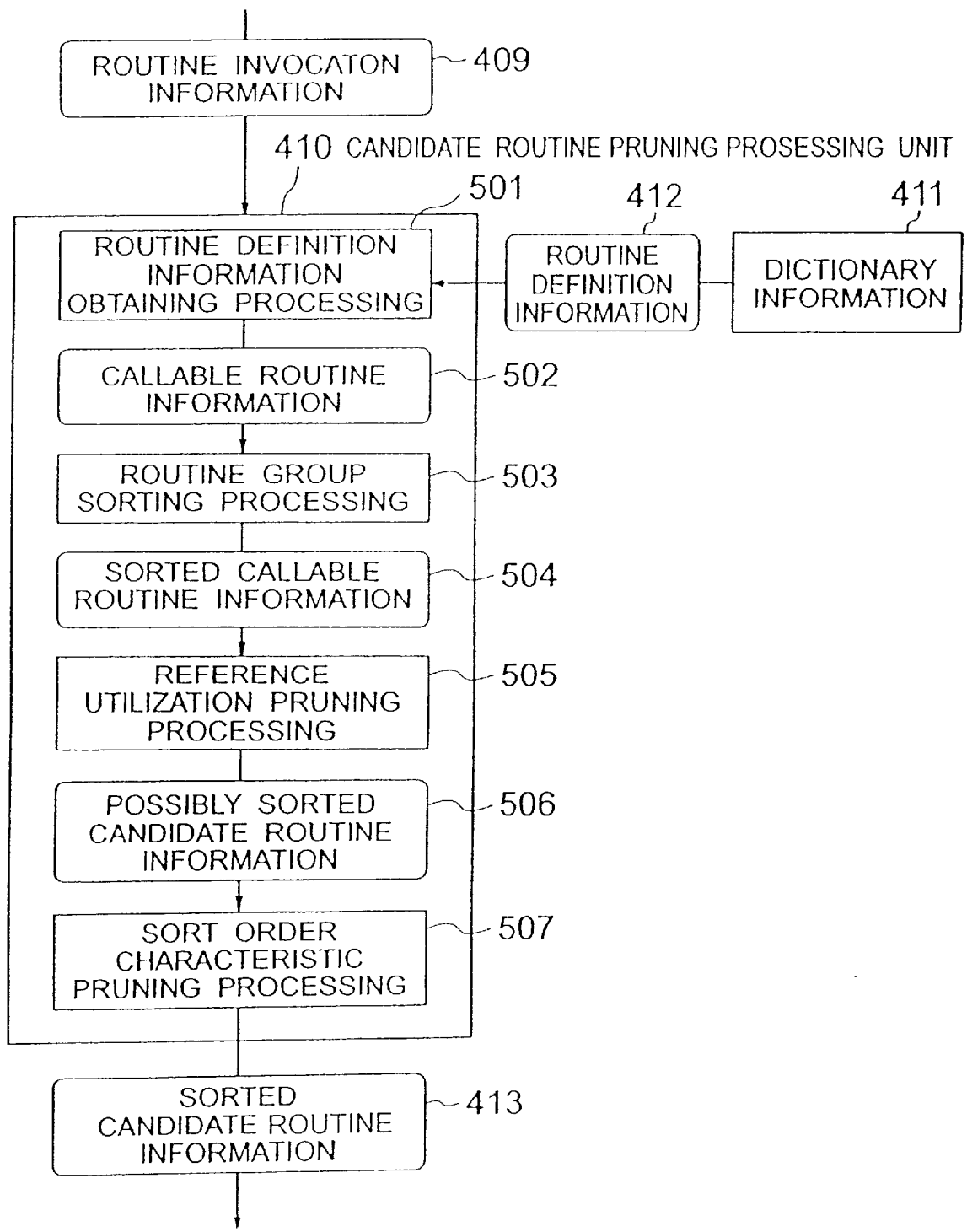
FIG. 2 is a diagram useful in explaining the processing contents of a processing 410 of pruning candidate routines shown in FIG. 1.

FIG. 2 is a diagram showing the processing contents of the candidate routine pruning processing portion 410 shown in FIG. 1 of the present embodiment. The candidate routine pruning processing portion 410 is the preprocessing of minimizing the processing load, which is required to resolve the overloaded routines during the execution, by selecting only the routine having the possibility of being applied for the routine invocation from among the overloaded routines.

The candidate routine pruning processing portion 410 includes a routine definition information obtaining processing portion 501, a routine group sorting processing portion 503, a reference utilization pruning processing portion 505, and a sort order characteristic pruning processing portion 507. In this connection, the details of those processing portions will be described later.

In the candidate routine pruning processing portion 410, the routine invocation information 409 which has been received from the meaning analysis processing portion 407 is sent to the routine definition information obtaining processing portion 501 to be used in the routine group sorting processing portion 503, the reference utilization pruning processing portion 505 and the sort order characteristic pruning processing portion 507 which are provided after the routine definition information obtaining processing portion 501.

In the routine definition information obtaining processing portion 501, the routines which are suitable to the routine invocation information 409 are selected from among the routine definition information 412 which has been obtained from the dictionary information 411 to produce callable routine information 502 on the basis of those routines thus selected. Then, the callable routine information 502 is delivered to the routine group sorting processing portion 503.

In the routine group sorting processing portion 503, the routines in the callable routine information 502 are sorted on the basis of the precedence of the data types of the parameters, and then the result which has been obtained by the sorting is delivered as sorted callable routine information 504 to the next reference utilization pruning processing portion 505.

Then, the reference utilization pruning processing portion 505 determines the routine, which is applied to the data type itself of the argument which has been specified to the routine invocation (hereinafter, referred to as "the reference routine" for short, when applicable), from among the sorted callable routine information 504. In addition, the reference utilization pruning processing portion 505 deletes any of the routines each having the lower precedence than that of the reference routine and then produces possibly sorted candidate routine information 506 on the basis of the remaining routines. Then, the possibly sorted candidate routine information 506 is delivered to the sort order characteristic pruning processing portion 507.

In the sort order characteristic pruning processing portion 507, any of the routines each of which has no possibility of being called is deleted from the possibly sorted candidate routine information 506 by comparing the data types of the parameters of the routine group with one another, and then the sorted candidate routine information 413 is produced on the basis of the remaining routines. As we have seen, FIG. 2 showing the outline of the processing in the candidate routine pruning processing portion 410 shown in FIG. 1 of the database system of the present embodiment has been described.

Figure 3:
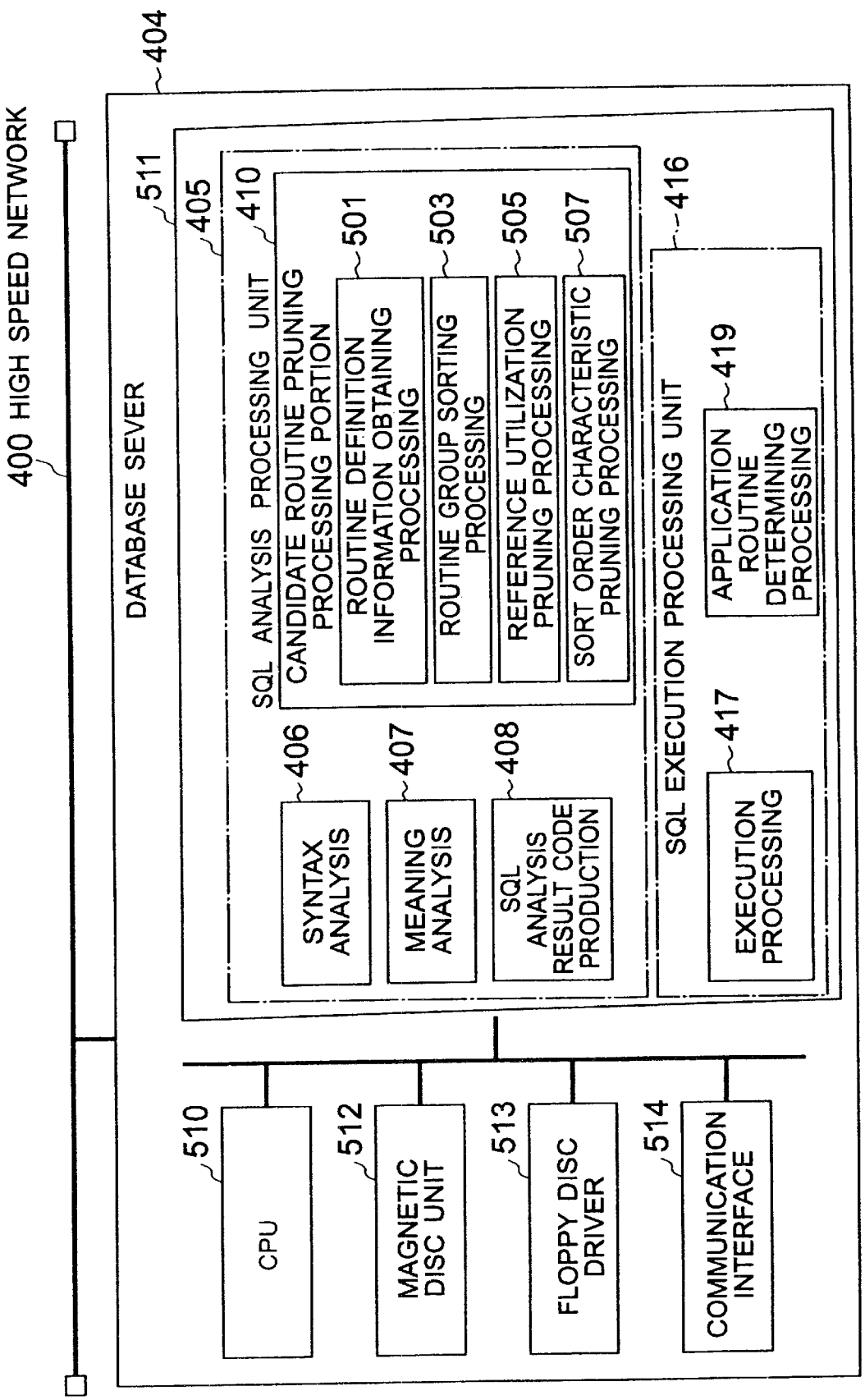
FIG. 3 is a block diagram showing a schematic configuration of a database server 404 of the embodiment according to the present invention.

FIG. 3 is a block diagram showing a schematic configuration of the database server 404 of the present embodiment. As shown in FIG. 3, the database server 404 of the present embodiment has a CPU 510, a memory 511, a magnetic disc unit 512, a floppy disc driver 513 and a communication interface 514.

The CPU 510 is the controller for controlling the overall operation of the database server 404. The memory 511 is the storage device for loading the processing programs and the data based on which the routine group sorting processing 503, the reference utilization pruning processing 505, the sort order characteristic pruning processing 507 and the application routine determining processing 419 are executed.

The magnetic disc unit 512 is the storage device for storing therein the processing programs and the data. The floppy disc driver 513 is the device for reading out/writing the data from/to the floppy disc in which the processing programs and the data are previously recorded. In addition, the communication interface 514 is the interface board through which the communication with the client 401 is carried out.

It is assumed that the processing programs for activating the database server 404 as the processing unit for executing the routine group sorting processing 503, the reference utilization pruning processing 505, the sort order characteristic pruning processing 507 and the application routine determining processing 419 are recorded in the recording medium such as a floppy disc and are stored in the magnetic disc unit 512, and then are loaded in the memory 511 to be executed. In this connection, the recording medium for recording therein the above-mentioned processing programs may be other media such as a CD-ROM other than the above-mentioned recording medium.

FIG. 4 is a diagram showing an example of the routine invocation of the present embodiment. In this example 601, overloaded function sale_info is called. First of all, in a declaration statement 602, a variable price of a money type as the ADT, a variable size of an INTEGER type, a variable property of a house type as the ADT are declared. In an SQL statement 603, the function sale_info is called with those variables price, size and property as the arguments and the result thereof is substituted for a variable r.

Reference numeral 606 designates the inheritance hierarchy between the ADTs. The house type and the memory type both as the ADTs have the inheritance hierarchies designated by reference numerals 605 and 606, respectively. The inheritance hierarchy 605 shows that the house type has a real_estate type as the supertype and also has a lodge type and a villa type each as the subtype. In addition, the inheritance hierarchy 606 shows that the money type has as the sybtypes thereof a yen type, a dollar type and a mark type.

From the substitutability as the character of the ADT, the money type and as the subtypes thereof, the yen type, the dollar type and the mark type can be each substituted for the variable price. Likewise, the house type. and as the subtypes thereof, the lodge type and the villa type can be each substituted for the variable property. Those ADTs and the inheritance hierarchies thereof are defined on the basis of the definition statements such as a CREATE TYPE. The details of the data and the processings in the candidate routine pruning processing portion 410 shown in FIG. 2 will hereinbelow be described using the example 601 of the routine invocation.

Figure 5:
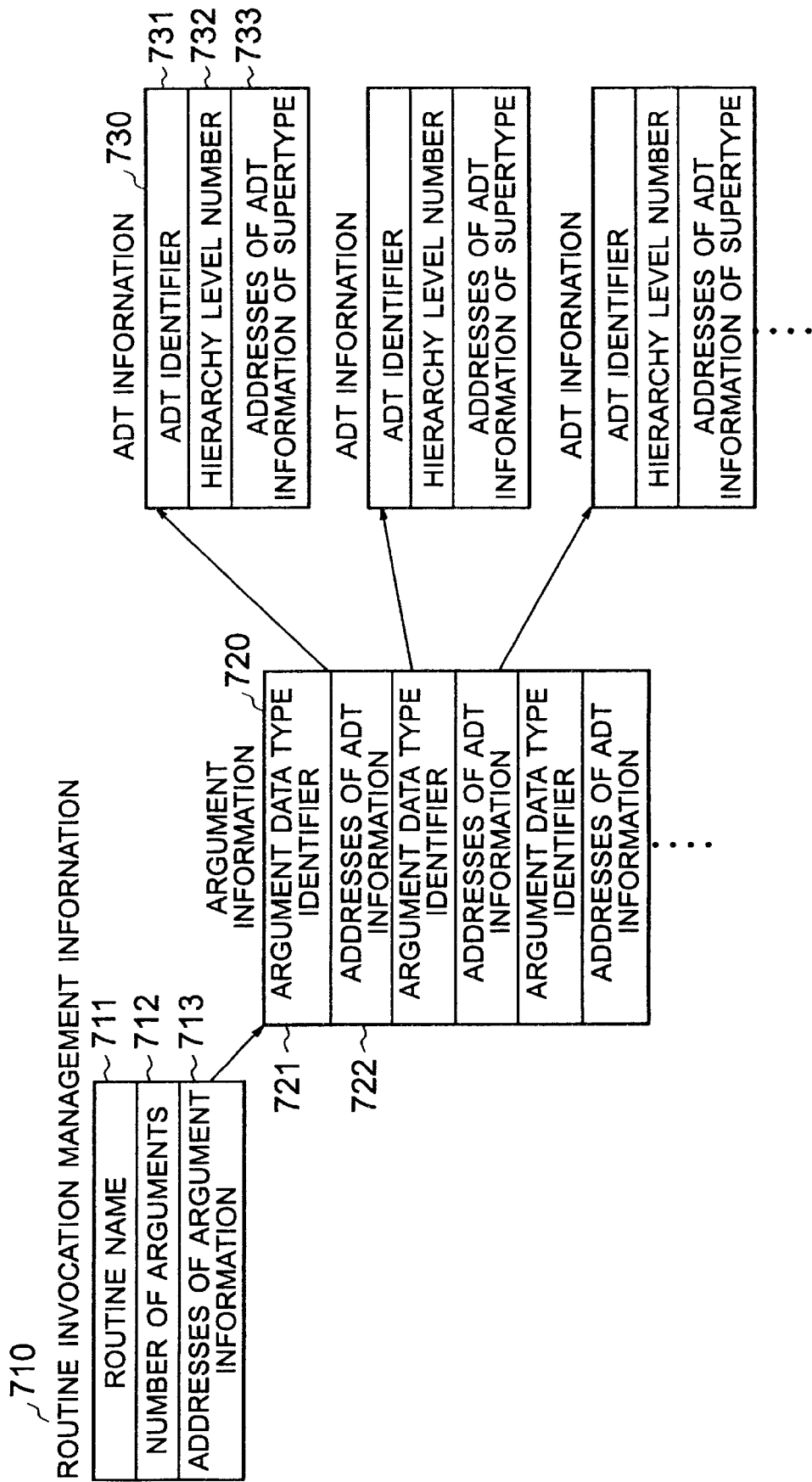
FIG. 5 is a diagram showing the structure of routine invocation information 409 of the embodiment.

FIG. 5 is a diagram showing the structure of the routine invocation information 409 of the present embodiment. Then, it is assumed in the database system of the present embodiment that the run time routine invocation information 418 has the same structure as that of the routine invocation information 409. Of course, the routine invocation information 409 may be different in the structure from the run time routine invocation information 418.

The routine invocation information 409 consists of routine invocation management information 710, argument information 720 and ADT information 730. The routine invocation management information 710 includes a routine name 711, the number of arguments 712 and addresses 713 of the argument information. The character string exhibiting the name of the routine to be called is entered into the item of the routine name 711. The information relating to the number of arguments which are specified when calling the routine is entered into the item of the number of arguments 712. The information relating to the addresses to the argument information 720 is entered, when the number of arguments 712 is equal to or larger than one, into the item of the addresses 713 of the argument information. When the number of arguments is equal to or larger than two, the argument information is prepared in the continuous region by the number of arguments, i.e., 712. The order of the argument information corresponds to the order of the arguments which are specified in the routine invocation.

In this connection, it is also possible in the database system of the present embodiment that the argument information 720 may be given the information relating to addresses to a plurality of argument information of the next argument or may be given a plurality of argument information in the list format. In addition, it is also possible that instead of the addresses, the offset may be used.

The argument information 720 includes an argument data type identifier 721 and addresses 722 of the ADT information. An identifier exhibiting the data type of the argument is entered into the item of the argument data type identifier 721. In the case of the ADT, an identifier exhibiting the ADT is entered into the item of the argument data type identifier 721. In addition, the information exhibiting what type of the ADT it is described in the ADT information 730. When the data type of the argument is the ADT, the information relating to the addresses to the ADT information 730 thereof is entered into the item of the addresses 722 of the ADT information. If a plurality of ADTs which are completely identical to one another are present in the argument, then the ADT information may be produced every argument information, and in such a case, one ADT information may be referred from a plurality of argument information.

The ADT information 730 consists of an ADT identifier 731, a hierarchy level number 732 and addresses 733 of the ADT information of the supertype. An identifier based on which the data types are distinguished among the ADTs is entered into the item of the ADT identifier 731. The hierarchy level number 732 exhibits the number which are inherited by the ADT indicated by the ADT information 730. In the case of the single hierarchy which can be given only one direct supertype, the hierarchy level number 732 matches the total number of supertypes, The information relating to the addresses to the ADT information 730 of the supertype is entered into the item of the addresses 733 of the ADT information of the supertype. When the supertype is absent, a NULL value is entered thereinto.

Now, what type of the routine invocation information 409 and the ADT information 730 is produced for the example 601 of the routine invocation shown in FIG. 4 will hereinbelow be described with reference to the associated drawings.

Figure 6:
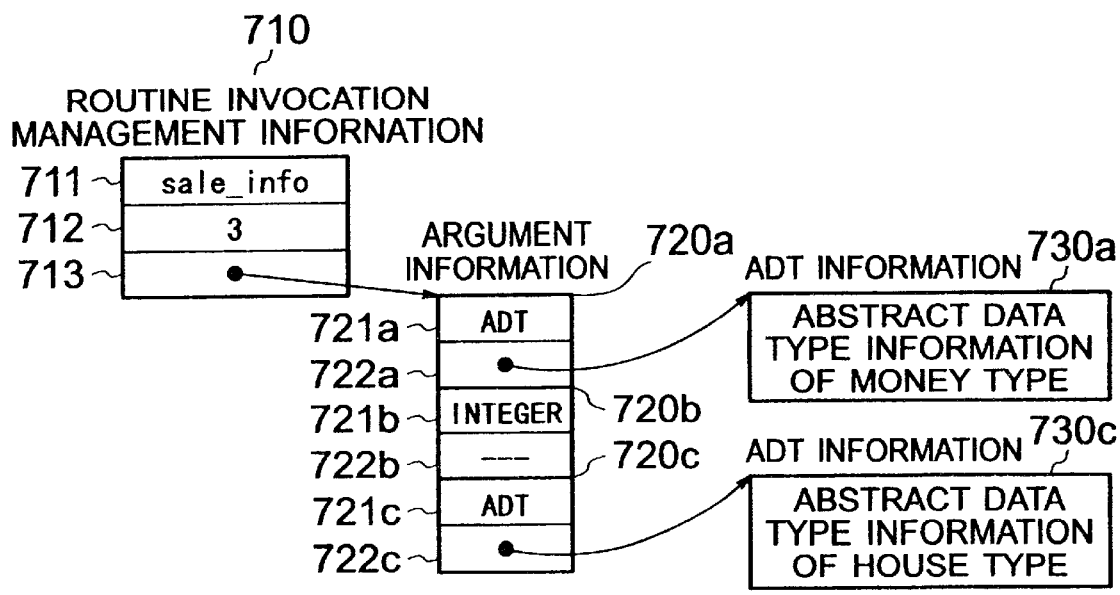
FIG. 6 is a diagram showing an example of the routine invocation information 409 relating to the routine invocation of the example shown in FIG. 4 of the embodiment.

FIG. 6 is a diagram showing an example of the routine invocation information 409 relating to the routine invocation of the example shown in FIG. 4 of the present embodiment. Each of elements of the routine invocation information 409 will hereinbelow be described. The details of the routine invocation management information 710 are as follows. A function name sale_info is entered into the item of a routine name 711. The number 3 of arguments when calling the function sale_info is entered into the item of the number of arguments 712. The first address of the argument information 720a is entered into the item of an address 713 of the argument information since the number of arguments, i.e., 712 is larger than 1. The contents of the argument information 720a, 720b and 720c are as follows.

The information of the money type as the first argument is entered into the item of the argument information 720a. The data type identifier exhibiting the ADT is entered into the item of an argument data type identifier 721a. The information relating to the addresses to ADT information 730a relating to the money type is entered into the item of addresses 722a of the ADT information. The information of the INTEGER type as the second argument is entered into the item of argument information 720b. The data type identifier exhibiting the INTEGER type is entered into the item of an argument data type identifier 721b. The value exhibiting NULL is entered into the item of an address 722b of the ADT information. The information of the house type as the third argument is entered into the item of argument information 720c. The data type identifier exhibiting the ADT is entered into the item of a data type identifier 721c. The information relating to the addresses of ADT information 730c relating to the house type is entered into the item of addresses 722c of the ADT information. In addition, the information relating to the money type and the house type each as the ADT is entered into the item of ADT information 730a and 730c, respectively.

Figure 7:
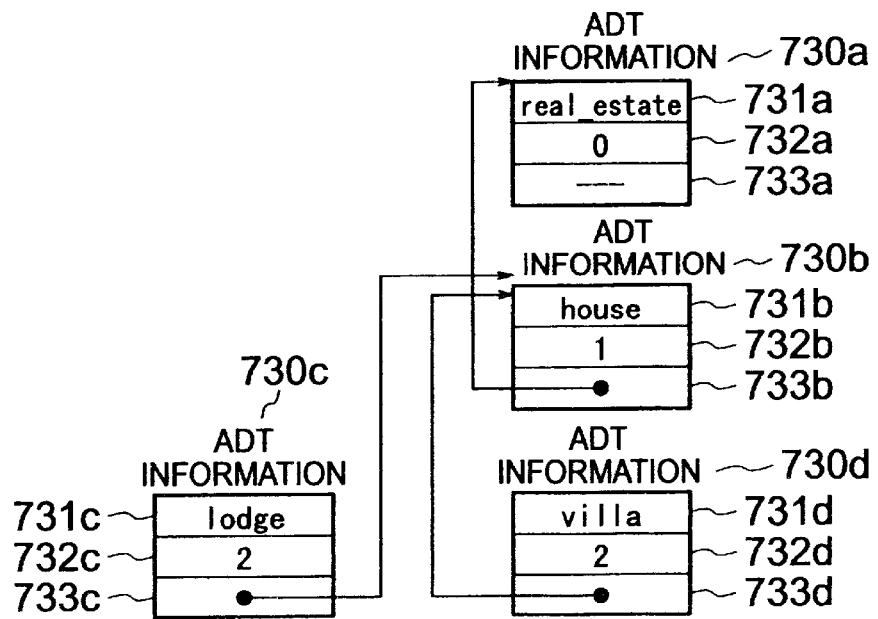
FIG. 7 is a diagram showing the details of ADT information of the embodiment.

FIG. 7 is a diagram showing the details of the ADT information of the present embodiment. Also, FIG. 7 shows the ADT information relating to the house type as the third argument in the example 601 of the routine invocation shown in FIG. 4. Reference numeral 730a designates the ADT information of a real_estate type. The identifier exhibiting the real_estate type is entered into the item of the ADT identifier 731a. Since the supertype of the real_estate type is absent, the number 0 is entered into the item of the hierarchy level number 732a, and NULL is entered into the item of an address 733a of the ADT information of the supertype.

Reference numeral 730b designates ADT information of the house type. The identifier exhibiting the house type is entered into the item of an ADT identifier 731b. Since the supertype of the house type is the real_estate type, the number 1 is entered into the item of the hierarchy level number 732, and the information relating to the address of the ADT information 730a of the real_estate type is entered into the item of addresses 733b of the ADT information of the supertype.

Reference numeral 730c designates ADT information of a lodge type. The identifier exhibiting the lodge type is entered into the item of an ADT identifier 731c. Since the supertype of the lodge type is the house type, the number 2 is entered into the item of a hierarchy level number 732c, and the information relating to the address of the ADT information 730b of the house type is entered into the item of an address 733c of the ADT information of the supertype.

Reference numeral 730d designates ADT information of a villa type. The identifier exhibiting the villa type is entered into the item of an ADT identifier 731d. Since the supertype of the villa type is the house type, the number 2 is entered into the item of a hierarchy level number 732d and the information relating to the address of the ADT information 730b of the house type is entered into the item of an address 733d of the ADT information of the supertype.

While in the present figure, with respect to the house type of the third argument, the structure of the ADT information 730 has been described, that structure is applied to the ADT information 730 as well of the money type of the first argument.

Figure 8:
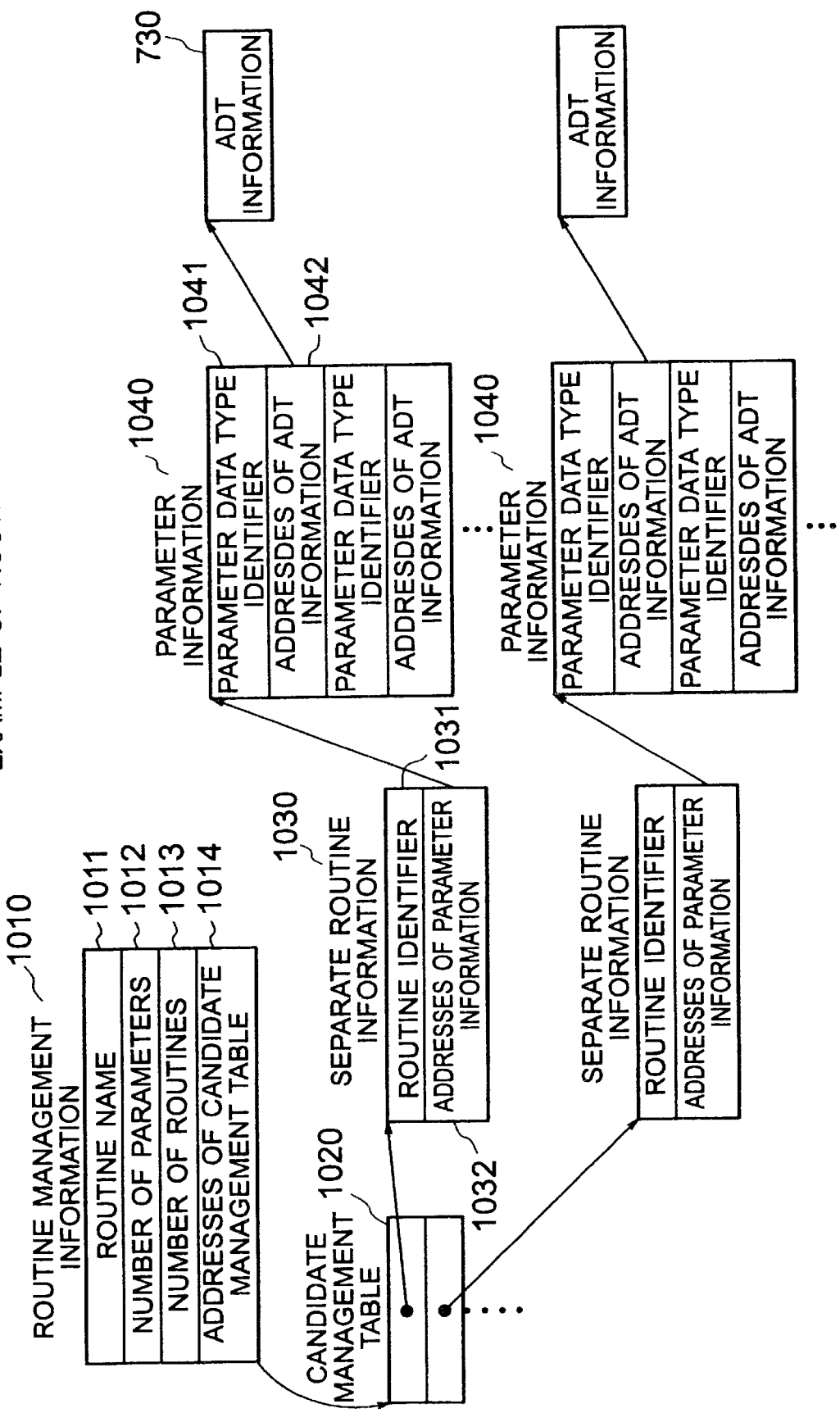
FIG. 8 is a diagram showing the structure of routine group information of the embodiment.

FIG. 8 is a diagram showing the structure of the routine group information of the present embodiment. The description will hereinbelow be given with respect to the callable routine information 502 which is produced by the routine definition information obtaining processing portion 501 shown in FIG. 2 with reference to FIG. 8. Then, it is assumed that the sorted callable routine information 504, the possibly sorted candidate routine information 506, the sorted candidate routine information 413 and the result code format candidate routine information 415 as well as the callable routine information 502 have all the format of the routine group information shown in FIG. 8. Of course, it should be noted that the above-mentioned information may have the different data formats, respectively. In this connection, one routine group information is produced for one routine invocation.

In FIG. 8, the routine group information consists of routine management information 1010, a candidate management table 1020, separate routine information 1030, parameter information 1040 and ADT information 730. The candidate routine management information 1010 consists of a routine name 1011, the number of parameters 1012, the number of routines 1013, and addresses 1014 of the candidate management table 1020. The information relating to the name of the routine which is specified to the routine invocation is entered in the form of the character string into the routine name 1011. The information relating to the number of parameters which the routine has is entered into the item of the number of parameters 1012. The information relating to the total number of routines which are contained in the routine group information is entered into the item of the number of routines 1013. The information relating to the addresses of the candidate management table 1020 are entered into the item of the addresses 1014 of the candidate management table 1020.

The candidate management table 1020 has the array in which the information relating to the addresses to the separate routine information 1030 is stored and also has the elements by the number which is specified to the number of routines 1013 in the routine management information 1010.

The separate routine information 1030 has the information with respect to each of the routines and also consists of a routine identifier 1031 and addresses 1032 of the parameter information. The identifier which is used to identify the routine is entered into the item of the routine identifier 1031. The information relating to the addresses of the parameter information 1040 which has the information of all of the parameters of the routines is entered into the item of the addresses 1032 of the parameter information.

The parameter information 1040 has the information every parameter of the routines and also consists of a parameter data type identifier 1041 and addresses 1042 of the ADT information. The identifier exhibiting the data type of the parameter is entered into the item of the parameter data type identifier 1041. When the data type of the parameter is the ADT, the information relating to the addresses to the ADT information 730 thereof is entered into the item of the addresses 1042 of the ADT information. On the other hand, when the data type of the parameter is the type other than the ADT, the information relating to NULL is entered into the item of the addresses 1042 of the ADT information.

FIG. 9 is a diagram showing an example of the routine group information of the present embodiment. Also, FIG. 9 shows how the overloaded routines are stored in the format of the routine group information shown in FIG. 8.

Routine group information 1001 corresponds to a concrete example of the routines which the routine management information 1010 has and also includes overloaded two routines 1002 and 1003. The routine 1002 corresponds to the function sale_info which has as the arguments the dollar type, the DECIMAL type and the lodge type. The routine 1003 corresponds to the function sale_info which has as the arguments the money type, the INTEGER type and the house type. But, it is assumed that the dollar type, the lodge type, the money type and the house type are all the ADTs and have the inheritance hierarchies shown in FIG. 4, respectively.

In the routine management information 1010, the information relating to the routine name sale_info is entered into the item of a routine name 1011, the information relating to the number of parameters, i.e., 3 is entered into the item of the number of parameters 1012, and the information relating to addresses to the candidate managing table 1020 is entered into the item of addresses 1014 of the candidate managing table 1020.

The information relating to the addresses to separate routine information 1030a and 1030b which corresponds to the routines 1002 and 1003, respectively, is stored in the candidate management table 1020. The information relating to the routine 1002 is stored in separate routine information 1030a. The identifier exhibiting the routine 1002 is entered into the item of a routine identifier 1031a, and the information relating to the addresses of parameter information 1040a with respect to a first parameter of the routine 1002 is entered into the item of an address 1032a of the parameter information. The parameters of the routine 1002 are stored in the items of parameter information 1040a, 1040b and 1040c, respectively.

The information relating to the dollar type as the first parameter of the routine 1002 is entered into the item of the parameter information 1040a, the identifier exhibiting the ADT is entered into the item of a parameter data type identifier 1041a, and the information relating to the addresses to the ADT information 730a with respect to the dollar type is entered into the item of addresses 1042a of the ADT information.

The information of the DECIMAL type as the second parameter of the routine 1002 is entered into the item of the parameter information 1040b, the identifier exhibiting the DECIMAL type is entered into the item of a parameter data type identifier 1041b, and the information relating to NULL is entered into the item of an address 1042b of the ADT information.

The information of the lodge type as the third parameter is entered into the item of the parameter information 1040c, the identifier exhibiting the ADT is entered into the item of a parameter data type identifier 1041c, and the information relating to the address to the ADT information 730b with respect to the lodge type is entered into the item of an address 1042c of the ADT information.

In this connection, the separate routine information 1030b has the information with respect to the routine 1003 similarly to the separate routine information 1930a.

Next, the description will hereinbelow be given with respect to the details of the routine definition information obtaining processing portion 501 shown in FIG. 2 of the database system of the present embodiment.

In the routine definition information obtaining processing portion 501, the routine definition information 412 is obtained from the dictionary information 411 on the basis of the routine name and the number of arguments which are contained in the routine invocation information 409, and the routines having the parameters which are suitable to the data type of the arguments in the routine invocation information 409 are selected from among the routine definition information 412, and also those routines are collectively arranged to produce the callable routine information 502. The data type of the parameters which are suitable to the data types of the arguments is, in the case of the ADT, the data type (ADT) which has the inheritance hierarchy with the data type of the arguments, while in the case of the data type other than the ADT, it is the data type to which the data type of the arguments can be applied. In this connection, the data type which can be applied to the case other than the ADT may vary depending on the system in some cases.

FIG. 10 is a diagram showing an example of the callable routine information 502 of the present embodiment. Also, FIG. 10 shows the example of the callable routine information 502 which the routine definition information obtaining processing portion 501 produces in response to the routine invocation shown in FIG. 4.

Five routines 1201 to 1205 are contained in an example 1200 of the callable routine information 502 and each of those routines 1201 to 1205 has the routine name sale_info and three parameters.

The data types of the parameters of the routine 1201 are, from the left-hand side, the dollar type, the INTEGER type, and the house type. The data types of the parameters of the routine 1202 are, from the left-hand side, the money type, the INTEGER type and the house type. The data types of the parameters of the routine 1203 are, from the left-hand side, the money type, the INTEGER type and the real_estate type. The data types of the parameters of the routine 1204 are, from the left-hand side, the dollar type, the DECIMAL type and the lodge type. Also, the data types of the parameters of the routine 1205 are, from the left-hand side, the yen type, the INTEGER type and the lodge type.

In the routines 1201 to 1205, the data types of the first parameters have the inheritance hierarchy with the money type as the data type of the first argument, the data types of the second parameters are the data types to which the INTEGER type as the data type of the second argument can be applied, and the data types of the third parameters are the data types which have the inheritance hierarchy with the house type as the data type of the third argument.

Next, the description will hereinbelow be given with respect to the details of the routine group sorting processing portion 503. In FIG. 2, the routine group sorting processing portion 503 receives as the input thereof the callable routine information 502 which has been produced by the routine definition information obtaining processing portion 501 and then permutes the callable routine information 502 in the order of decreasing precedence using the precedence of the data types of the parameters, thereby producing the sorted callable routine information 504.

As for the sorting method, we may adopt any kind of a sorting method as long as it permutes the addresses of the stored separate routine information 1030 in the candidate management table 1020 shown in FIG. 8 to carry out the permutation in the order of decreasing precedence of the data types of the parameter. In this connection, the precedence of the parameters decreases from the left-hand side to the right-hand side. With respect to the precedence levels of the data types of the parameters, in the case where the data type of the parameter is the ADT, the data type of the parameter is given high precedence as the hierarchy level number 732 (refer to FIG. 5) is larger. In addition, in the case of the data type other than the ADT, the precedence on the data type precedence list of the corresponding arguments is adopted.

Then, it is assumed that in the sorted callable routine information 504 which has been obtained on the basis of this sorting, a plurality of routines which can be invoked for the data type of a certain actual argument are present. In this case, since the sorting is carried out in accordance with the above-mentioned precedence, the routine which is given top precedence in terms of the sorting order becomes the optimal routine.

FIG. 11 is a diagram showing an example of the sorted callable routine information 504 of the present embodiment. Also, FIG. 11 shows an example of the sorted callable routine information 504 which is obtained on the basis of the processing in the routine group sorting processing portion 503 when in the routine invocation shown in FIG. 4, the callable routine information 502 is made the example 1200 shown in FIG. 10. An example 1300 of the sorted callable routine information 504 is obtained by sorting the five routines 1201 to 1205 in the example 1200 of the callable routine information 502 in the order of decreasing precedence 1310 of the parameters. Then, it is assumed that the precedence decreases from the upper side to the lower side (i.e., in this example, in the order of routines 1205, 1201, 1204 and 1203).

Next, the description will hereinbelow be given with respect to the details of the reference utilization pruning processing 505. The processing flow is shown in FIG. 12 using a PAD (Problem Analysis Diagram) diagram.

FIG. 12 is a PAD diagram showing the details of the reference utilization pruning processing portion 505 of the present embodiment. In Step 1401, with respect to the sorted callable routine information 505 which is produced on the basis of the processing in the routine group sorting processing portion 503, the reference routine is searched for from the head of the routines until it has been found out. At this time, it is checked whether or not the routine in search is the routine which can be applied to the data type of the argument which has been specified in the routine invocation (Step 1402). If it is judged in Step 1402 that the routine in search can be applied to the data type of the argument, then the routine of interest is determined to be the reference routine (Step 1403).

In next Step 1404, any of the routines after the reference routine in the sorting order is deleted, and the remaining routines, i.e., the reference routine and the routines before the reference routine in the sorting order, are made the possibly sorted candidate routine information 506. In this connection, the processing of deleting the routines is executed in such a way as to delete the addresses of the separate routine information 1030 from on the candidate management table 1020 (refer to FIG. 9).

For the example 1300 of the sorted callable routine information 504 shown in FIG. 11, an example of the possibly sorted candidate routine information 506 which is obtained on the basis of the processing in the reference utilization pruning processing portion 505 is shown in FIG. 13.

FIG. 13 is a diagram showing an example of the possibly sorted candidate routine information 506 of the present embodiment. The data types of the argument of the routine invocation are, from the left-hand side, the money type, the INTEGER type and the house type, and hence if the routine which can be applied to that argument is searched for from the head of the routine group in the example 1300 of the sorted callable routine information 504, then the routine 1202 is found out. Therefore, this routine 1202 is made the reference routine, and also the routine 1203 which is lower in the precedence than the reference routine in the sorting order is deleted, thereby obtaining the possibly sorted candidate routine information 506.

Next, the description will hereinbelow be given with respect to the details of the sort order characteristic pruning processing 507. In FIG. 2, the sort order characteristic pruning processing 507 is such that the data types of the parameters of the routines in the possibly sorted candidate routine information 506 which is produced on the basis of the processing in the reference utilization pruning processing portion 505 are compared with one another to delete any of the routines each of which has no possibility of being invoked to produce the sorted candidate routine information 413 on the basis of the remaining routines.

Figure 14:
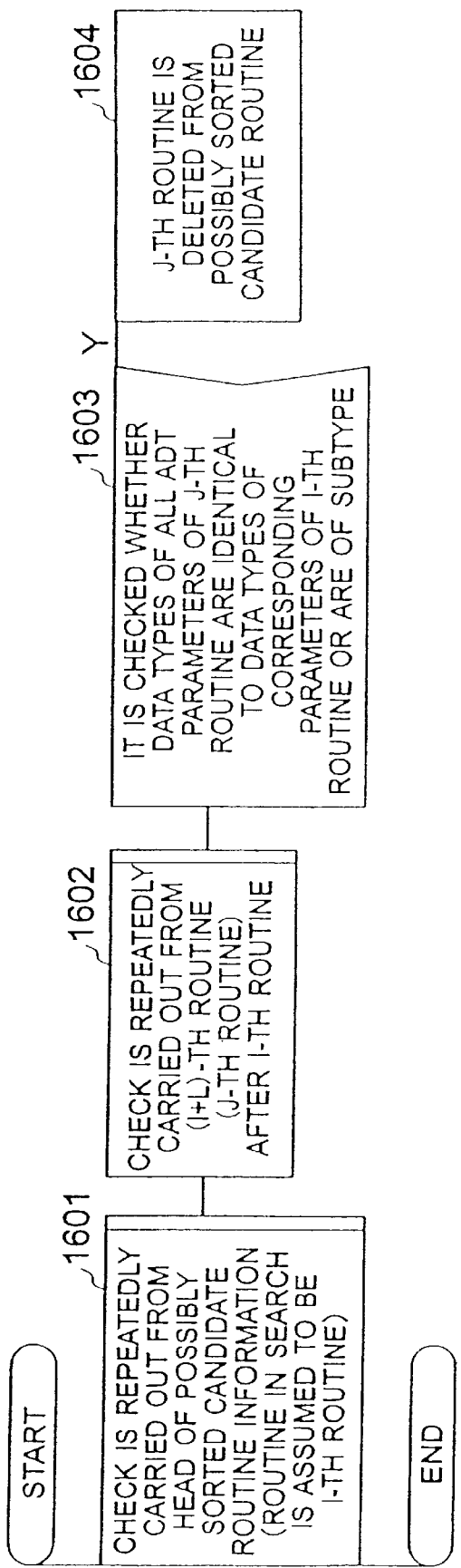
FIG. 14 is a PAD diagram useful in explaining the flow of a sort order characteristic pruning processing 507 of the embodiment.

FIG. 14 is a PAD diagram showing the flow of the sort order characteristic pruning processing 507 of the present embodiment. First of all, in Step 1601, the check is carried out from the head of the possibly sorted candidate routine information 506. Then, it is assumed that the routine which is being checked at this time is the i-th routine. Next, in Step 1602, the comparison of the data types of the parameters of the i-th routine with the data types of the parameters of any of the routines after the i-th routine (the routine of interest is assumed to be the j-th routine) is repeatedly carried out.

In the comparison processing in Step 1603, it is checked whether all of the ADT parameters of the j-th routine are identical to all of the ADT parameters of the i-th routine, or are of the subtype. If so, since the j-th routine has no possibility of being called due to the presence of the i-th routine, the j-th routine is deleted from the possibly sorted candidate routine information 506 (Step 1604).

Thus, the comparison is repeatedly carried out in Steps 1601 and 1602 to delete any of the routines each of which has no possibility of being called to produce the sorted candidate routine information 413 on the basis of the remaining routines.

Figure 15:
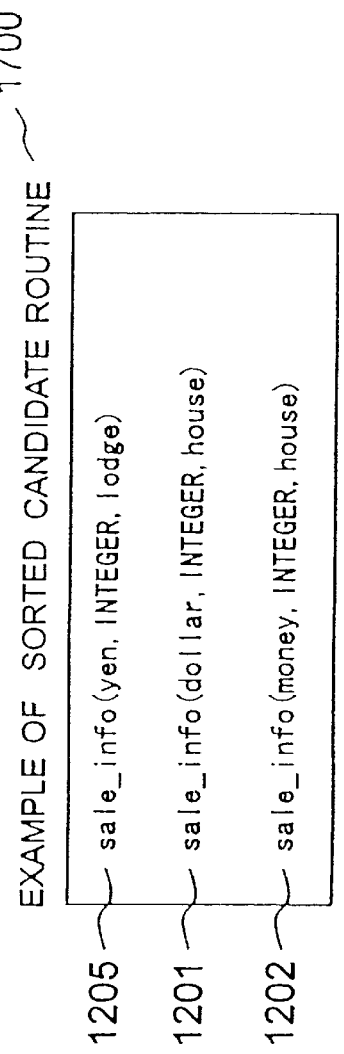
FIG. 15 is a diagram showing an example of sorted candidate routine information 413 of the embodiment.

FIG. 15 is a diagram showing an example of the sorted candidate routine information 413 of the present embodiment.

FIG. 15 shows, as opposed to the example 1500 of the possibly sorted candidate routine information 506 shown in FIG. 13, an example of the sorted candidate routine information 413 which is obtained on the basis of the processing in the sort order characteristic pruning processing portion 507. In the example 1500 of the possibly sorted candidate routine information 506, the data types of the parameters of the routines 1205, 1201, 1204 and 1202 are compared with one another on the basis of the procedure shown in the PAD diagram as described above (refer to FIG. 14).

At this time, in the processing of comparing the routine 1201 with the routine 1204, the data types of all of the ADT parameters of the routine 1204 are either identical to the data types of the corresponding ADT parameters of the routine 1201, or of the subtype. Therefore, the routine 1201 which has the high precedence can also be applied to the data types of all of the arguments to which the routine 1204 can be applied. As a result, the routine 1204 is deleted from the candidates since it has no possibility of being called and then the remaining routines 1205, 1201 and 1202 form an example 1700 of the possibly sorted candidate information 413.

Next, the application routine determining processing portion 419 shown in FIG. 1 will hereinbelow be described in detail. The application routine determining processing portion 419 checks up the routines from the head in the result code format candidate routine information 415 contained in the SQL analysis result code 414, and then returns the identifier of the first routine which can be applied to the data types of the arguments in execution contained in the run time routine invocation information 418 as the application routine information 420 back to the execution processing portion 417.

Then, the execution processing portion 417 invokes the routines on the basis of the application routine information 420 (the identifier of the application routine) which has been received from the application routine determining processing portion 420. The processing flow in the application routine determining processing portion 419 is shown in the form of a PAD diagram in FIG. 16.

Figure 16:
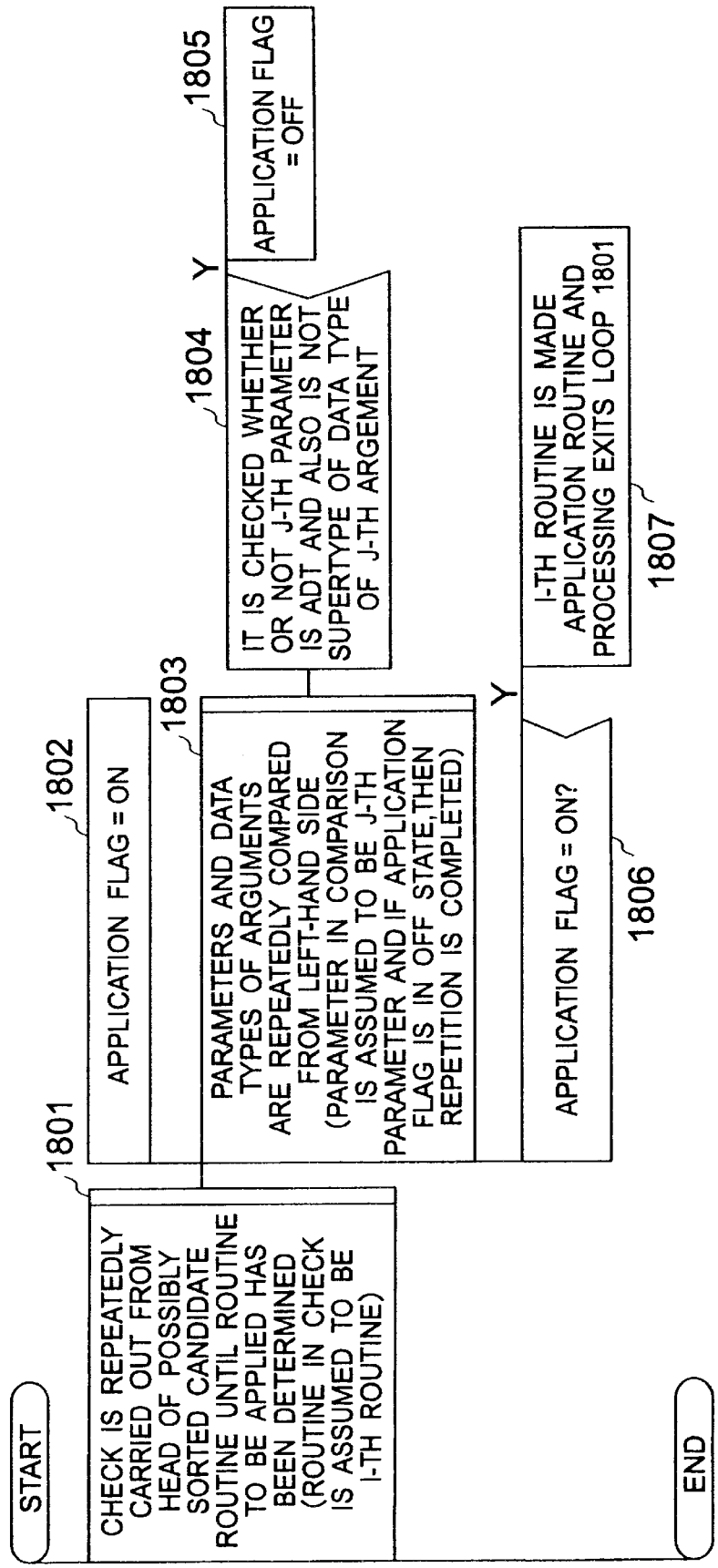
FIG. 16 is a PAD diagram showing the outline of an application routine determining processing 419 of the embodiment.
Figure 17:
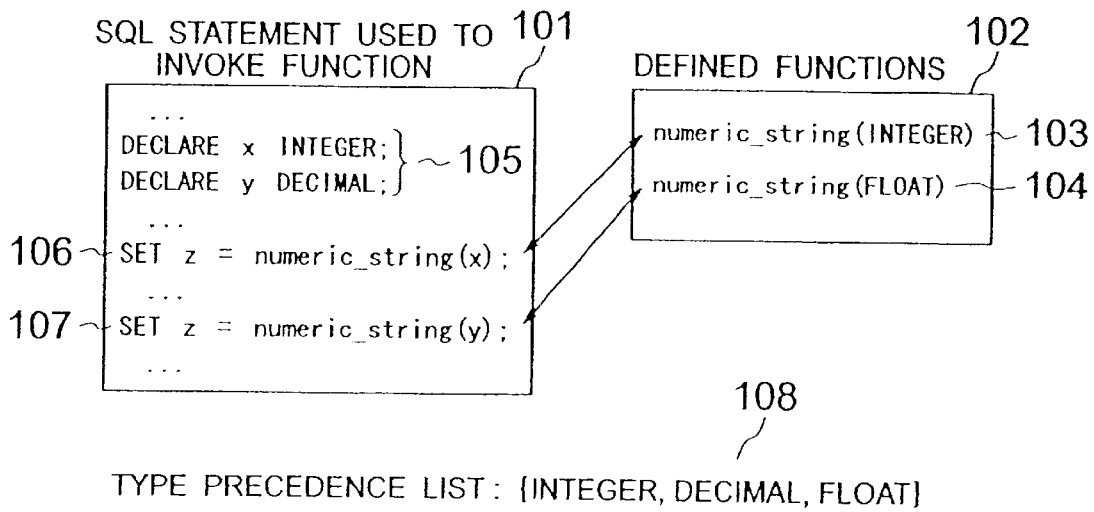
FIG. 17 is a diagram showing a conventional example of an SQL statement based on which the overloaded functions are called.
Figure 18:
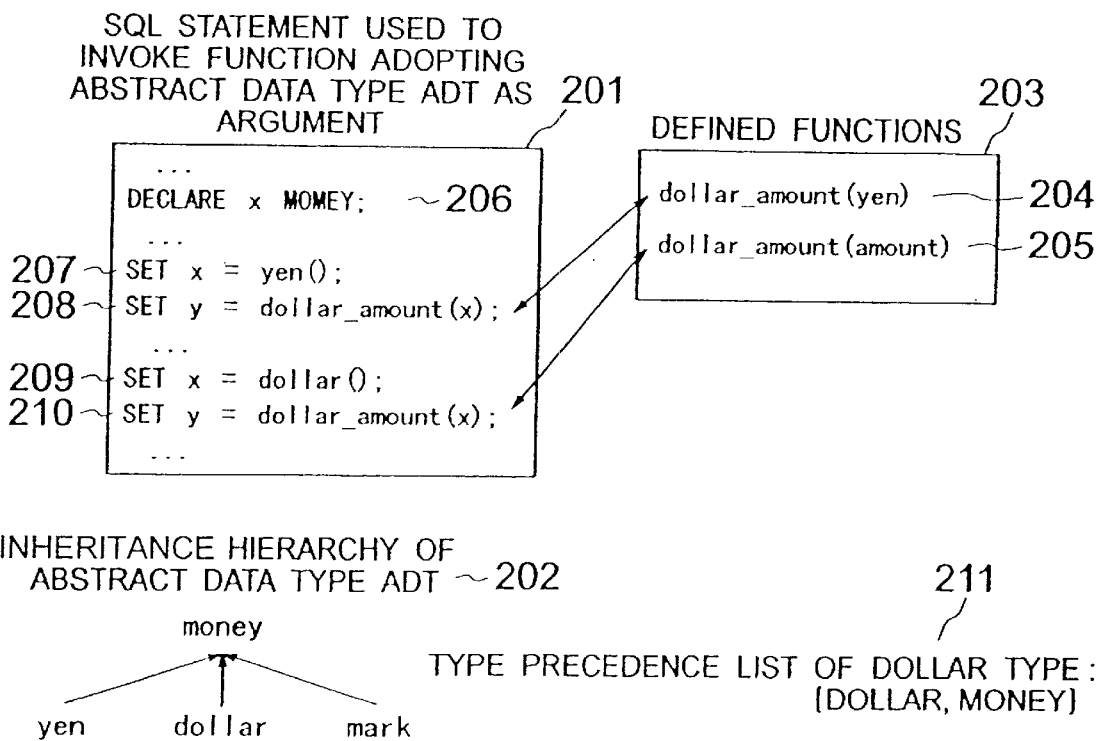
FIG. 18 is a diagram showing a conventional example of an SQL statement based on which the overloaded functions each adopting an ADT as an argument are called.
Figure 19:
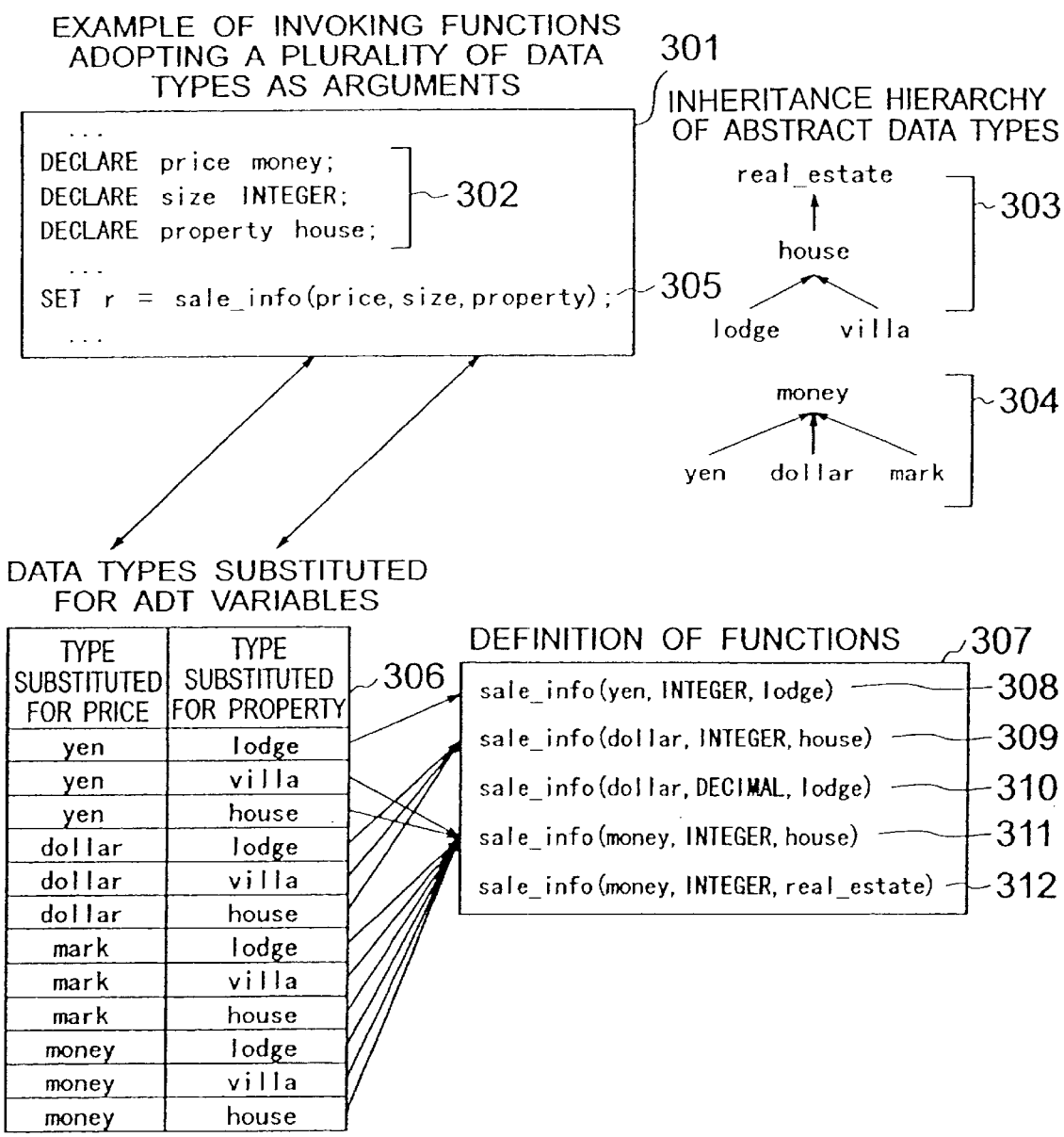
FIG. 19 is a diagram showing a conventional example of the function invocation in the case where the functions which adopt a data type of the ADT and a data type other than the ADT, respectively, are overloaded.

FIG. 16 is a PAD diagram showing the outline of the application routine determining processing portion 419 of the present embodiment. In Step 1801, the check is carried out for the routines, from the head, of the result code format candidate routine information 415 and this check is repeatedly carried out until the applicable routine has been determined. In this connection, the routine in check is assumed to be the i-th routine from the head.

The repetition processing in Step 1801 consists of Steps 1802, 1803 and 1806. In Step 1802, an i application flag is set to an ON state. In next Step 1803, the parameters and the data types of the arguments of the i-th routine are repeatedly compared, from the left-hand side, with one another until the application flag has become an OFF state or the comparison of all of the parameters has been completed. In this connection, the parameter in the comparison is assumed to be the j-th parameter from the left-hand side. In the repetition processing in Step 1803, the j-th parameter is compared with the data type of the j-th argument. At this time, if it is determined that the j-th parameter is the ADT and also is not the supertype of the data type of the j-th argument, then the application flag is set to an OFF state (Step 1805).

If the comparison of all of the parameters has been completed on the basis of the repetition processing in Step 1803, or the application flag is in the OFF state, then the state of the application flag is checked in Step 1806. If the application flag is in the ON state, then the i-th routine for which the comparison of the parameters has been carried out is made the application routine and also the repetition processing in Step 1801 is completed.

In such a way, in the application routine determining processing portion 419, only one routine to be applied is determined from the result code format candidate routine information 415.

As we have seen, as shown in the database system of the present embodiment, for the invocation for the overloaded routines in the example shown in FIG. 4, in the prior art, the possibility of application must be checked with respect to the five routines for the 4×3=12 kinds of combinations of the data types which the argument may adopt, whereas in the present embodiment, the possibility of applying the four routines has only to be checked on the basis of the processing in the candidate routine pruning processing portion 410.

In the prior art, the check is required to be carried out by the number of times of the product of the number of subtypes of the ADT arguments x the number of callable routines, whereas in the present invention, the application routine can be determined with the much less amount of processing on the order of the number of routines.

As described above, according to the database system of the present embodiment, when analyzing the query for the database including the invocation for the overloaded routines, the routine which has the possibility of being applied is determined on the basis of the comparison of parameters among the overloaded routines. Therefore, in the candidate pruning processing which is used to resolve the overloaded routines and which is executed when analyzing the query for the database, the candidates can be pruned with the less amount of processing and also the necessary minimum candidate can be selected efficiently.

As set forth hereinabove, according to the present invention, when analyzing the database query including the invocation of the overloaded routines, the routine which has the possibility of being applied is determined on the basis of the comparison of parameters among the overloaded routines. Therefore, in the candidate pruning processing which is used to resolve the overloaded routines and which is executed when analyzing the query for the database, the candidates can be pruned with the less amount of processing and also the necessary minimum candidate can be selected efficiently.

While the present invention has been particularly shown and described with reference to the preferred embodiment, it will be understood that the various changes and modifications within the scope and spirit of the invention are included in the present invention.

What is claimed is:

1. An overloaded routines resolving method of analyzing an invocation for a group of routines overloaded to determine a routine to be called, when a request for inquiry including a routine invocation is input, comprising:

a routine selecting step of, in response to said routine invocation included in said request for inquiry, obtaining routine information having a same routine name and a same number of arguments as those of said routine invocation from dictionary information of said routine and selecting routines having arguments adaptable to data types of arguments of said routine invocation among said routine information obtained;

a routine group sorting step of sorting the group of routines selected in said routine selecting step on a basis of predetermined precedence of data types of arguments;

a reference utilization pruning step of determining a routine having a highest precedence of said data types of arguments among the routines which can be called for types of definition of the arguments of the invocation from routines sorted and deleting a routine having lower precedence than that of the routine thus determined from candidates; and a sorted characteristic pruning step of comparing the data types of corresponding arguments among routines which still remain in said reference utilization pruning step and extracting all arguments whose data types are abstract data type ADT and deleting a routine having a lower precedence in a sorting order, when a data type of each argument extracted is identical to a data type of argument of a same position of a routine having a higher precedence in said sorting order or a sub-type of a data type of argument of said same position of said routine having a higher precedence in said sorting order.

2. A database server for analyzing an invocation for the group of overloaded routines to determine the routine to be called, when a request for inquiry including a routine invocation is input, comprising:

a routine selecting processing unit for obtaining routine information having a same routine name and a same number of arguments as those of said routine invocation from dictionary information of said routine and selecting routines having arguments adaptable to data types of arguments of said routine invocation among said routine information obtained;

a routine group sorting unit for sorting the group of routines selected in said routine selecting processing on a basis of predetermined precedence of data types of arguments;

a reference utilization pruning processing unit for determining the routine which has the highest precedence of a data type of an argument from among the routines which can be called for the types in the definition of the arguments of the invocation from the sorted routines and for deleting any of the routines each of which has the lower precedence than that of the routine thus determined from the candidates; and a sorted characteristic pruning processing unit for comparing the data types of corresponding arguments among routines which still remain in said reference utilization pruning processing and extracting all arguments whose data types are abstract data type ADT and deleting a routine having a lower precedence in a sorting order, when a data type of each argument extracted is identical to a data type of argument of a same position of a routine having a higher precedence in said sorting order or a sub-type of a data type of argument of said same position of said routine having a higher precedence in said sorting order.

3. A medium for recording therein a program which is used to operate a computer as a database server for analyzing an invocation for the group of overloaded routines to determine the routine to be called, when a request for inquiry including a routine invocation is input, said database server comprising:

a routine selecting processing unit for obtaining routine information having a same routine name and a same number of arguments as those of said routine invocation from dictionary information of said routine and selecting routines having arguments adaptable to data types of arguments of said routine invocation among said routine information obtained;

a routine group sorting unit for sorting the group of routines selected in said routine selecting processing on a basis of predetermined precedence of data types of arguments;

a reference utilization pruning processing unit for determining the routine which has the highest precedence of a data type of an argument from among the routines which can be called for the types in the definition of the arguments of the invocation from the sorted routines and for deleting any of the routines each of which has the lower precedence than that of the routine thus determined from the candidates; and a sorted characteristic pruning processing unit for comparing the data types of corresponding arguments among routines which still remain in said reference utilization pruning processing and extracting all arguments whose data types are abstract data type ADT and deleting a routine having a lower precedence in a sorting order, when a data type of each argument extracted is identical to a data type of argument of a same position of a routine having a higher precedence in said sorting order or a sub-type of a data type of argument of said same position of said routine having a higher precedence in said sorting order.

4. A overloaded routines resolving method of analyzing an invocation for the group of overloaded routines to determine the routine to be called, when a request for inquiry including a routine invocation is input, said method comprising:

a routine selecting step of, in response to said routine invocation included in said request for inquiry, obtaining routine information having a same routine name and a same number of arguments as those of said routine invocation from dictionary information of said routine and selecting routines having arguments adaptable to data types of arguments of said routine invocation among said routine information obtained;

a routine group sorting step of sorting the group of routines selected in said routine selecting step on a basis of predetermined application precedence of data types of arguments;

a reference utilization pruning step of determining the routine which has the highest precedence of a data type of an argument from among the routines which can be called for the types in the definition of the arguments of the invocation from the sorted routines and of deleting any of the routines each of which has the lower precedence than that of the routine thus determined from the candidates; and a sorted characteristic pruning step of comparing the data types of corresponding arguments among routines which still remain in said reference utilization pruning step and extracting all arguments whose data types are abstract data type ADT and deleting a routine having a lower precedence in a sorting order, when a data type of each argument extracted is identical to a data type of argument of a same position of a routine having a higher precedence in said sorting order or a sub-type of a data type of argument of said same position of said routine having a higher precedence in said sorting order.

5. An overloaded routines resolving method according to claim 4, further comprising the application routine determining step of searching for the routine to be called, from the head of the routines, which can be started for the data type of the argument when determining the routine to be called from among the routines each of which has the possibility of being applied for the invocation for the overloaded routines which have been obtained to apply the routine which has been found out first, thereby selecting one routine which is to be applied for the invocation for the overloaded routines.

6. An overloaded routines resolving method of analyzing an invocation for the group of overloaded routines to determine the routine to be called, when a request for inquiry including a routine invocation is input, said method comprising:

a routine selecting step of, in response to said routine invocation included in said request for inquiry, obtaining routine information having a same routine name and a same number of arguments as those of said routine invocation from dictionary information of said routine and selecting routines having arguments adaptable to data types of arguments of said routine invocation among said routine information obtained;

a routine group sorting step of sorting the group of routines selected in said routine selecting step on a basis of predetermined application precedence of data types of arguments; and a reference utilization pruning step of determining the routine which has the highest precedence of a data type of an argument from among the routines which can be called for the types in the definition of the arguments of the invocation from the sorted routines and of deleting any of the routines each of which has the lower precedence than that of the routine thus determined from the candidates.

7. An overloaded routines resolving method of analyzing an invocation for the group of overloaded routines to determine the routine to be called, when a request for inquiry including a routine invocation is input, said method comprising:

a routine selecting step of, in response to said routine invocation included in said request for inquiry, obtaining routine information having a same routine name and a same number of arguments as those of said routine invocation from dictionary information of said routine and selecting routines having arguments adaptable to data types of arguments of said routine invocation among said routine information obtained;

a routine group sorting step of sorting the group of routines selected in said routine selecting step on a basis of predetermined application precedence of data types of arguments; and a sorted characteristic pruning step of comparing the data types of corresponding arguments among routines which have been sorted and extracting all arguments whose data types are abstract data type ADT and deleting a routine having a lower precedence in a sorting order, when a data type of each argument extracted is identical to a data type of argument of a same position of a routine having a higher precedence in said sorting order or a sub-type of a data type of argument of said same position of said routine having a higher precedence in said sorting order.

8. An overloaded routines resolving method according to claim 7, further comprising the application routine determining step of searching for the routine to be called, from the head of the routines, which can be started for the data type of the argument when determining the routine to be called from among the routines each of which has the possibility of being applied for the invocation for the overloaded routines which have been obtained to apply the routine which has been found out first, thereby selecting one routine which is to be applied for the invocation for the overloaded routines.

9. An overloaded routines resolving method according to claim 8, wherein in said routine group sorting step, the group of routines is further sorted with the inheritance hierarchy of the data types of the arguments as the precedence.

10. An overloaded routines resolving method according to claim 8, wherein in said sort order characteristic pruning step, when comparing the arguments among the routines, if each of the data types which have all of the inheritance hierarchy of the routines each having the higher precedence in the sorting order is a supertype of an argument corresponding to a routine having the lower precedence, the routine having the data type of the supertype is judged to have no possibility of having any of the routines each having the lower precedence applied thereto and deleted from the candidates.

11. An overloaded routines resolving method of analyzing an invocation for the group of overloaded routines to determine the routine to be called, when a request for inquiry including a routine invocation is input, said method comprising:

a routine selecting step of, in response to said routine invocation included in said request for inquiry, obtaining routine information having a same routine name and a same number of arguments as those of said routine invocation from dictionary information of said routine and selecting routines having arguments adaptable to data types of arguments of said routine invocation among said routine information obtained;

a routine group sorting step of sorting the group of routines selected in said routine selecting step on a basis of predetermined application precedence of data types of arguments; and an application routine determining step of searching for the routine to be actually called, from the head of the routines, which can be started for the data type of the argument when determining the routine to be actually called among the sorted routines to apply the routine which has been found out first, thereby selecting one routine which is to be applied for the invocation for the overloaded routines.

12. An overloaded routine resolving processing apparatus for analyzing an invocation for the group of overloaded routines to determine the routine to be called, when a request for inquiry including a routine invocation is input, said apparatus comprising:

a routine selecting means for, in response to said routine invocation included in said request for inquiry, obtaining routine information having a same routine name and a same number of arguments as those of said routine invocation from dictionary information of said routine and selecting routines having arguments adaptable to data types of arguments of said routine invocation among said routine information obtained;

a routine group sorting means for sorting the group of routines selected in said routine selecting means on a basis of predetermined application precedence of data types of arguments;

a reference utilization pruning means for determining the routine which has the highest precedence of a data type of an argument from among the routines which can be called for the types in the definition of the arguments of the invocation from the sorted routines and for deleting any of the routines each of which has the lower precedence than that of the routine thus determined from the candidates; and a sorted characteristic pruning means for comparing the data types of corresponding arguments among routines which still remain after having executed the processing by said reference utilization pruning means and extracting all arguments whose data types are abstract data type ADT and deleting a routine having a lower precedence in a sorting order, when a data type of each argument extracted is identical to a data type of argument of a same position of a routine having a higher precedence in said sorting order or a sub-type of a data type of argument of said same position of said routine having a higher precedence in said sorting order.

13. An overloaded routine resolving processing apparatus for analyzing an invocation for the group of overloaded routines to determine the routine to be called, when a request for inquiry including a routine invocation is input, said apparatus comprising:

a routine selecting means for, in response to said routine invocation included in said request for inquiry, obtaining routine information having a same routine name and a same number of arguments as those of said routine invocation from dictionary information of said routine and selecting routines having arguments adaptable to data types of arguments of said routine invocation among said routine information obtained;

a routine group sorting means for sorting the group of routines selected in said routine selecting means on a basis of predetermined application precedence of data types of arguments; and a reference utilization pruning means for determining the routine which has the highest precedence of a data type of an argument from among the routines which can be called for the types in the definition of the arguments of the invocation form the sorted routines and for deleting any of the routines each of which has the lower precedence than that of the routine thus determined from the candidates.

14. An overloaded routine resolving processing apparatus for analyzing an invocation for the group of overloaded routines to determine the routine to be called, when a request for inquiry including a routine invocation is input, said apparatus comprising:

a routine selecting means for, in response to said routine invocation included in said request for inquiry, obtaining routine information having a same routine name and a same number of arguments as those of said routine invocation from dictionary information of said routine and selecting routines having arguments adaptable to data types of arguments of said routine invocation among said routine information obtained;

a routine group sorting means for sorting the group of routines selected in said routine selecting means on a basis of predetermined application precedence of data types of arguments; and a sorted characteristic pruning means for comparing the data types of corresponding arguments among routines which have been sorted and extracting all arguments whose data types are abstract data type ADT and deleting a routine having a lower precedence in a sorting order, when a data type of each argument extracted is identical to a data type of argument of a same position of a routine having a higher precedence in said sorting order or a sub-type of a data type of argument of said same position of said routine having a higher precedence in said sorting order.

15. An overloaded routine resolving processing apparatus for analyzing an invocation for the group of overloaded routines to determine the routine to be called, when a request for inquiry including a routine invocation is input, said apparatus comprising:

a routine selecting means for, in response to said routine invocation included in said request for inquiry, obtaining routine information having a same routine name and a same number of arguments as those of said routine invocation from dictionary information of said routine and selecting routines having arguments adaptable to data types of arguments of said routine invocation among said routine information obtained;

a routine group sorting means for sorting the group of routines selected in said routine selecting means on a basis of predetermined application precedence of data types of arguments; and application routine determining means for searching for the routine to be actually called, from the head of the routines, which can be started for the data type of the actual argument when determining the routine to be actually called among the sorted routines to apply actually the routine which has been found out first, thereby selecting only one routine which is to be applied for the invocation for the overloaded routines.

* * * * *